US012126169B2

(12) United States Patent
Hiroe et al.

(10) Patent No.: US 12,126,169 B2
(45) Date of Patent: Oct. 22, 2024

(54) MEASUREMENT DEVICE, MEASUREMENT SYSTEM, MEASUREMENT METHOD, AND NON-TRANSITORY COMPUTER READABLE MEDIUM FOR DETERMINING SETTLEMENT FOR COMPENSATING A USER FOR POWER RECEIVED OR PROVIDED

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP); Ryo Sase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 27 days.

(21) Appl. No.: 18/012,395

(22) PCT Filed: Aug. 30, 2021

(86) PCT No.: PCT/JP2021/031743
§ 371 (c)(1),
(2) Date: Dec. 22, 2022

(87) PCT Pub. No.: WO2022/050220
PCT Pub. Date: Mar. 10, 2022

(65) Prior Publication Data
US 2023/0268737 A1 Aug. 24, 2023

(30) Foreign Application Priority Data

Sep. 4, 2020 (JP) ................................. 2020-148878

(51) Int. Cl.
*H02J 3/00* (2006.01)
*G06Q 30/0283* (2023.01)
(Continued)

(52) U.S. Cl.
CPC ............ *H02J 3/00* (2013.01); *G06Q 30/0283* (2013.01); *G06Q 50/06* (2013.01); *H02J 3/16* (2013.01); *H02J 3/46* (2013.01)

(58) Field of Classification Search
CPC .................................. H02J 3/00; G06Q 50/06
See application file for complete search history.

(56) References Cited

U.S. PATENT DOCUMENTS

2019/0295191 A1    9/2019  Hiroe et al.
2023/0288492 A1*   9/2023  Hiroe ..................... H02J 13/00

FOREIGN PATENT DOCUMENTS

JP         5886400 B1    3/2016
JP         6664016 B2    3/2020

OTHER PUBLICATIONS

International Search Report in corresponding International Application No. PCT/JP2021/031743, dated Nov. 16, 2021 (4 pages).

(Continued)

*Primary Examiner* — Adi Amrany
(74) *Attorney, Agent, or Firm* — Osha Bergman Watanabe & Burton LLP

(57) ABSTRACT

A settlement device includes a measured value acquisition unit to acquire a measured value of active power transmitted or received at a connection point of a power transmission and distribution network and a regulating power providing means capable of providing regulating power to the power transmission and distribution network and a measured value of a frequency at the connection point; a regulating power measurement unit to measure regulating power at the connection point on the basis of the acquired measured value of the active power and the acquired measured value of the frequency; a regulating power amount calculation unit to calculate an amount of regulating power of a prescribed period at the connection point by integrating the regulating power over time; a power amount acquisition unit to acquire (Continued)

an amount of power transmitted or received in the prescribed period at the connection point; and a settlement unit.

13 Claims, 16 Drawing Sheets

(51) Int. Cl.
    *G06Q 50/06*     (2012.01)
    *H02J 3/16*     (2006.01)
    *H02J 3/46*     (2006.01)

(56)     References Cited

OTHER PUBLICATIONS

Written Opinion in corresponding International Application No. PCT/JP2021/031743, dated Nov. 16, 2021 (6 pages).

\* cited by examiner

FIG. 6

| $t, h$ | $f, Hz$ | POWER PLANT a ||| POWER PLANT b |||
|---|---|---|---|---|---|---|---|
| | | $P_a$, kW | $\Delta P_{GFa}$, kW | $\Delta W_{GFa}$, kWh | $P_b$, kW | $\Delta P_{GFb}$, kW | $\Delta W_{GFb}$, kWh |
| $t_0$ | 60.0 | 100 | - | - | 100 | - | - |
| $t_1 (= t_0 + \Delta T)$ | 62.4 | 0 | 100 | 100$\Delta T$ | 100 | 0 | 0 |
| $t_2 (= t_0 + 2\Delta T)$ | 60.0 | 100 | 100 | 100$\Delta T$ | 100 | 0 | 0 |
| $t_3 (= t_0 + 3\Delta T)$ | 62.4 | 0 | 100 | 100$\Delta T$ | 100 | 0 | 0 |
| $t_4 (= t_0 + 4\Delta T)$ | 60.0 | 100 | 100 | 100$\Delta T$ | 100 | 0 | 0 |
| $t_5 (= t_0 + 5\Delta T)$ | 62.4 | 0 | 100 | 100$\Delta T$ | 100 | 0 | 0 |
| $t_6 (= t_0 + 6\Delta T)$ | 60.0 | 100 | 100 | 100$\Delta T$ | - | - | 0 |
| SUM FROM $t_1$ TO $t_6$ | - | - | 600 | 600$\Delta T$ | - | - | 0 |

MEASUREMENT DEVICE, MEASUREMENT SYSTEM, MEASUREMENT METHOD, AND NON-TRANSITORY COMPUTER READABLE MEDIUM FOR DETERMINING SETTLEMENT FOR COMPENSATING A USER FOR POWER RECEIVED OR PROVIDED

TECHNICAL FIELD

The present disclosure relates to a settlement device, a settlement system, a settlement method, and a program.

Priority is claimed on Japanese Patent Application No. 2020-148878, filed Sep. 4, 2020, the content of which is incorporated herein by reference.

BACKGROUND ART

Frequencies of power transmission and distribution systems are maintained by combining "regulating power" from power sources based on (1) governor free (GF) operation, (2) load frequency control (LFC), and (3) economic load dispatching control (EDC) in accordance with a fluctuation period of power demand. Due to the deregulation of power supply, it is assumed that a transmission system operator (TSO) procures regulating power from a power generation business operator and the like through public offering or on the market.

Power demand in offices, factories, and general households may fluctuate from moment to moment. When the power demand of the power transmission and distribution system exceeds the power supply, the frequency of the power transmission and distribution system drops below a reference value (e.g., 50 Hz or 60 Hz). In contrast, when the power supply exceeds the power demand, the frequency rises above the reference value. "Regulating power" is used to balance such fluctuations in supply and demand that fluctuate from moment to moment. When regulating power is ideally provided, the frequency coincides with the reference value.

Load frequency control (LFC) is generally used for demand fluctuation during a period from several minutes to less than 30 minutes. According to the load frequency control, regulating power corresponding to frequency fluctuation in the power transmission and distribution system is provided. That is, when the frequency of the power transmission and distribution system does not reach a reference value, a transmission system operator for managing the power transmission and distribution system procures positive regulating power from a power generation business operator. On the other hand, when the frequency of the power transmission and distribution system exceeds the reference value, the transmission system operator procures negative regulating power from the power generation business operator. The actual procurement of regulating power based on the load frequency control is performed so that the power generation business operator regulates an output of a power source in response to a moment-to-moment instruction transmitted from the transmission system operator.

Stable power supply based on the load frequency control (LFC) depends on a process in which the power generation business operator provides the regulating power according to the instruction from the transmission system operator. Therefore, in the deregulation of power supply, a mechanism in which the transmission system operator pays compensation according to the performance of provision of regulating power to the power generation business operator (settlement according to the provision of the regulating power) is being studied.

However, when the transmission system operator issues an instruction specific to regulating power sharply fluctuating within a very short time period, a power supplier may not be able to respond to the instruction and a penalty may be imposed in contrast. Also, the frequency differs according to each location in the power transmission and distribution system. Although it is desirable to provide a detailed regulating power-specific instruction for each location in the power transmission and distribution system, a process of providing the detailed regulating power-specific instruction is impractical due to power oscillation that occurs within a short time period (e.g., a period of 3 to 5 seconds).

Therefore, a regulation process based on a governor free (GF) operation autonomously performed in a power source (including a turbine device and a power generator) owned by the power generation business operator is performed with respect to short-period demand fluctuation. The governor free operation is an operation of controlling an amount of fuel supplied to the turbine device or the like such that the uniform rotational speed of the power generator is maintained with respect to a change in the rotational speed due to load fluctuation.

Also, the power source using the turbine device as the driving force has a mechanism to store inertial energy internally during operation. This inertial energy is automatically transmitted to or received from the load in accordance with load fluctuation, thereby contributing to a stable operation of a buffer for the load fluctuation.

Because the governor free operation or the provision of the regulating power by inertia is carried out autonomously at each power source regardless of an instruction from the transmission system operator, it is not measured by the transmission system operator. Therefore, the regulating power provided through the governor free operation or inertia does not become a target of payment (settlement) of compensation by the transmission system operator. Consequently, there is an imbalance in which the compensation for the regulating power provided by the load frequency control is paid and the compensation for the regulating power provided by the governor free operation is not paid. Thus, it is necessary to measure the regulating power actually provided by a regulating power supply source such as a power source together with the regulating power provided by the governor free operation.

For example, Patent Literature 1 discloses a power market price formation system and method capable of enhancing price transparency and ensuring regulating power necessary for stable supply.

CITATION LIST

Patent Literature

[Patent Literature 1]
Japanese Patent No. 5886400

SUMMARY OF INVENTION

Technical Problem

However, although the technology described in Patent Literature 1 is particularly effective when the balance of power supply and demand fluctuates in a long period of 30 minutes, 1 hour, or the like within a power system, it is not effective when the supply and demand balance fluctuates in a short period of, for example, about 1 second.

A specific example will be described. For example, long-period frequency fluctuation threatens stable power supply. This is particularly noticeable in Japan's tandem power systems (power systems in which multiple power companies' power systems are linked in series) and is a phenomenon in which frequencies at both ends of the tandem power system (for example, Kyushu Electric Power Company and Chubu Electric Power Company in Japan's 60 Hz system) oscillate in opposite directions in a seesaw-like manner at intervals of one to several seconds. In this situation, power surpluses and shortages occur at the same time at distant locations. For example, at the time when the frequency of Kyushu Electric Power Company at the end of the seesaw is high, the frequency of Chubu Electric Power Company at the opposite end of the seesaw is low. In this case, the market price of regulating power must be changed for each location in order to apply the technology described in Patent Literature 1. Moreover, the price must be changed at least about ten times in one period to show a state in which the price increases or decreases depending on the frequency. If the period of frequency fluctuation is 1 second, the market price will be updated every 0.1 seconds. Patent Literature 1 describes that information is collected in a system operation computer of a system operation organization and the price is decided on by the computer. In this way, it is difficult to implement centralized and real-time price decision for all regions in consideration of a computational capability and reliability.

Also, Patent Literature 1 describes a process of transmitting a price to a terminal of a consumer. Even if the problem of a computational capability and computational reliability were solved, the price would fluctuate in a period of one to several seconds, which could lead to market turmoil in the situation described above. In this way, as in Patent Literature 1, the method of deciding on the price of an amount of power according to the supply and demand balance of electric power is not effective in regulating supply and demand in a period of several seconds as in long-period fluctuation in the power system even if transparency is high. Thus, there is a need for a mechanism that measures regulating power and performs a settlement process based on its performance The present disclosure has been made in view of such problems and provides a settlement device, a settlement system, a settlement method, and a program capable of settling both compensation corresponding to an amount of transmitted or received power and compensation corresponding to regulating power of power supply and demand.

Solution to Problem

According to an aspect of the present disclosure, there is provided a settlement device including: a measured value acquisition unit configured to acquire a measured value of active power transmitted or received at a connection point of a power transmission and distribution network and a regulating power providing means capable of providing regulating power to the power transmission and distribution network and a measured value of a frequency at the connection point; a regulating power measurement unit configured to measure regulating power at the connection point on the basis of the acquired measured value of the active power and the acquired measured value of the frequency; a regulating power amount calculation unit configured to calculate an amount of regulating power of a prescribed period at the connection point on the basis of the regulating power; a power amount acquisition unit configured to acquire an amount of power transmitted or received in the prescribed period at the connection point; and a settlement unit configured to settle compensation for the regulating power provided by the regulating power providing means and the power transmitted or received by the regulating power providing means on the basis of a sum of the amount of regulating power and the amount of power.

According to an aspect of the present disclosure, there is provided a settlement system including: a settlement device provided at a connection point of a power transmission and distribution network and a regulating power providing means capable of providing regulating power to the power transmission and distribution network; and a server communicatively connected to the settlement device. The settlement device includes a measured value acquisition unit configured to acquire a measured value of active power transmitted or received at the connection point and a measured value of a frequency at the connection point; a regulating power measurement unit configured to measure regulating power at the connection point on the basis of the acquired measured value of the active power and the acquired measured value of the frequency; a regulation unit configured to multiply a price regulation coefficient for regulating compensation for the regulating power by the measured regulating power; a regulating power amount calculation unit configured to calculate an amount of regulating power of a prescribed period at the connection point by integrating values obtained by multiplying the regulating power by the price regulation coefficient over time; a power amount acquisition unit configured to acquire an amount of power transmitted or received in the prescribed period at the connection point; and a settlement unit configured to settle compensation for the regulating power provided by the regulating power providing means and the power transmitted or received by the regulating power providing means on the basis of a sum of the amount of regulating power and the amount of power. The server includes an evaluation unit configured to evaluate stationarity of the regulating power of the regulating power providing means; and a coefficient decision unit configured to change the price regulation coefficient in accordance with a result of evaluating the stationarity in the evaluation unit. The regulation unit of the settlement device acquires the price regulation coefficient changed by the coefficient decision unit of the server. Although regulating power that is supplied by the power generation business operator has been described to simplify the description, an office, a factory, a general household, or the like can also provide regulating power by turning off the air conditioning to reduce demand in a time period of peak power usage on the basis of the daily power usage forecast disclosed by the transmission system operator. Therefore, like a power source, each office, factory, or general household is also the regulating power providing means.

According to an aspect of the present disclosure, there is provided a settlement method including steps of: acquiring a measured value of active power transmitted or received at a connection point of a power transmission and distribution network and a regulating power providing means capable of providing regulating power to the power transmission and distribution network and a measured value of a frequency at the connection point; measuring regulating power at the connection point on the basis of the acquired measured value of the active power and the acquired measured value of the frequency; calculating an amount of regulating power of a prescribed period at the connection point on the basis of the regulating power; acquiring an amount of power transmitted or received in the prescribed period at the connection point; and settling compensation for the regulating power provided by the regulating power providing means and the power transmitted or received by the regulating power providing means on the basis of a sum of the amount of regulating power and the amount of power.

According to an aspect of the present disclosure, there is provided a program for causing a computer of a settlement device to execute steps of: acquiring a measured value of active power transmitted or received at a connection point of a power transmission and distribution network and a regulating power providing means capable of providing regulating power to the power transmission and distribution network and a measured value of a frequency at the connection point; measuring regulating power at the connection point on the basis of the acquired measured value of the active power and the acquired measured value of the frequency; calculating an amount of regulating power of a prescribed period at the connection point on the basis of the regulating power; acquiring an amount of power transmitted or received in the prescribed period at the connection point; and settling compensation for the regulating power provided by the regulating power providing means and the power transmitted or received by the regulating power providing means on the basis of a sum of the amount of regulating power and the amount of power.

Advantageous Effects of Invention

According to a settlement device, a settlement system, a settlement method, and a program related to the present disclosure, it is possible to settle both compensation corresponding to an amount of transmitted or received power and compensation corresponding to regulating power of power supply and demand.

BRIEF DESCRIPTION OF DRAWINGS

FIG. 6 is a second diagram for describing a function of the settlement device according to the first embodiment of the present disclosure.

DESCRIPTION OF EMBODIMENTS

First Embodiment

A settlement device and a settlement system 1 including the settlement device according to a first embodiment of the present disclosure will be described below with reference to FIGS. 1 to 6.

Overall Configuration of Settlement System

Figure 1:
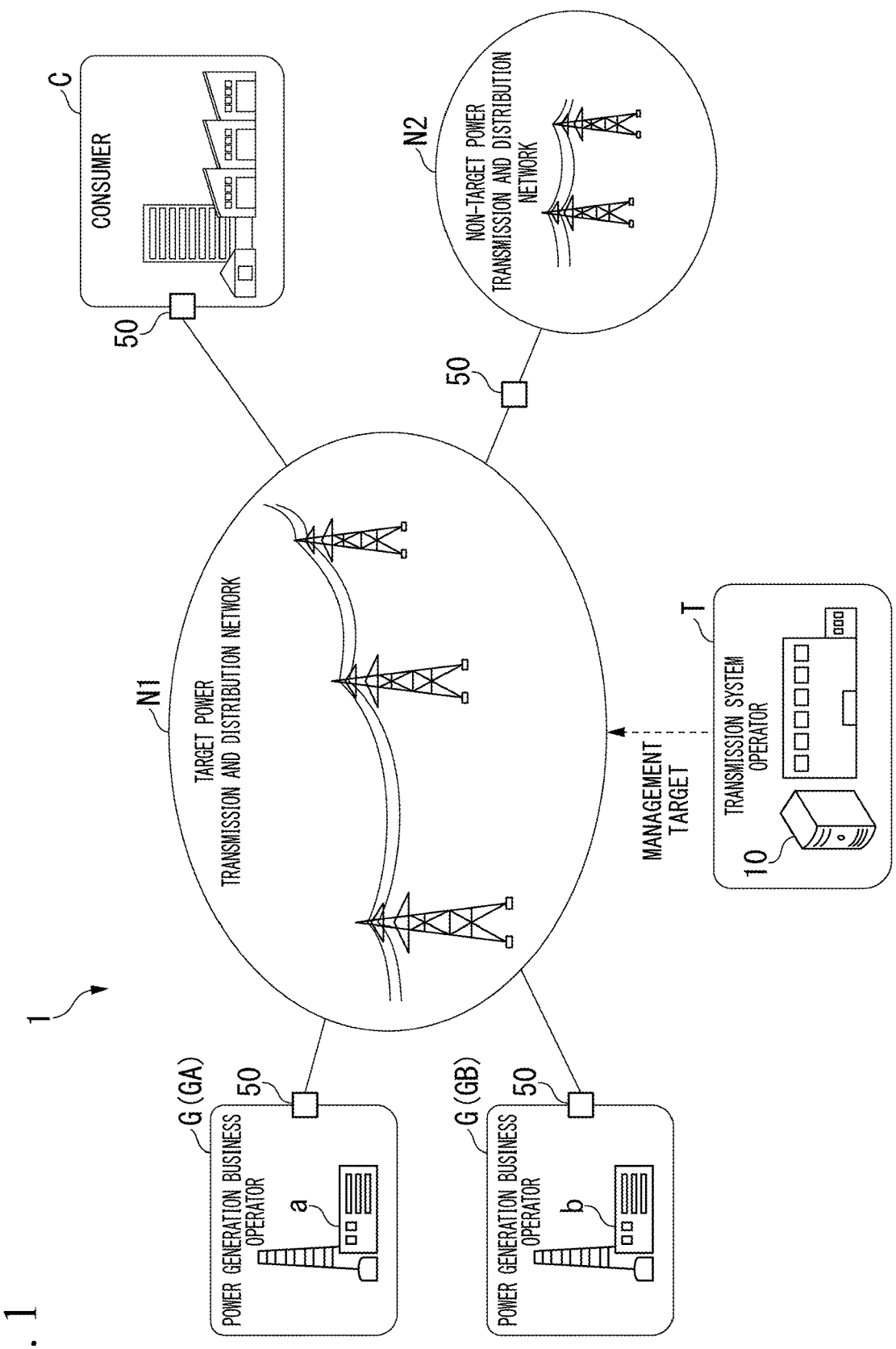
FIG. 1 is a diagram showing an overall configuration of a settlement system according to a first embodiment of the present disclosure.

FIG. 1 is a diagram showing an overall configuration of the settlement system according to the first embodiment of the present disclosure.

In FIG. 1, power generation business operators G (GA and GB) for generating electric power, a transmission system operator T for transmitting and distributing the generated power, and a consumer C consuming the transmitted and distributed power are shown. In the example shown in FIG. 1, the power generation business operator G and the consumer C are connected to a power transmission and distribution network to be managed by the transmission system operator T (hereinafter also referred to as a target power transmission and distribution network N1). The power generated by the power generation business operator G flows to the consumer C through the target power transmission and distribution network N1. The target power transmission and distribution network N1 is also connected to a power transmission and distribution network to be managed by another general power transmission and distribution business operator (hereinafter also referred to as a non-target power transmission and distribution network N2).

As shown in FIG. 1, the settlement system 1 includes a server 10 and a settlement device 50.

The settlement device 50 is installed at a connection point between the target power transmission and distribution network N1 and the regulating power providing means managed by the power generation business operator G or the like and can settle compensation for power transmitted or received at the connection point and "regulating power" provided by the power generation business operator G or the like. Here, the "regulating power providing means" is a device or the like that can provide regulating power for the power supply and demand balance to the power transmission and distribution network (the target power transmission and distribution network N1). More specifically, the "regulating power providing means" is a power source (to be described below) that is managed by the power generation business operator G, a stabilization device, a load that is managed by the consumer C, or a power transmission and distribution network (the non-target transmission and distribution network N2) excluded from management by the transmission system operator T.

The server 10 is managed (or operated) by the transmission system operator T. For example, the server 10 collects a settlement result of the power generation business operator G or the like from the settlement device installed at each connection point.

Details of Configuration of Settlement System

Figure 2:
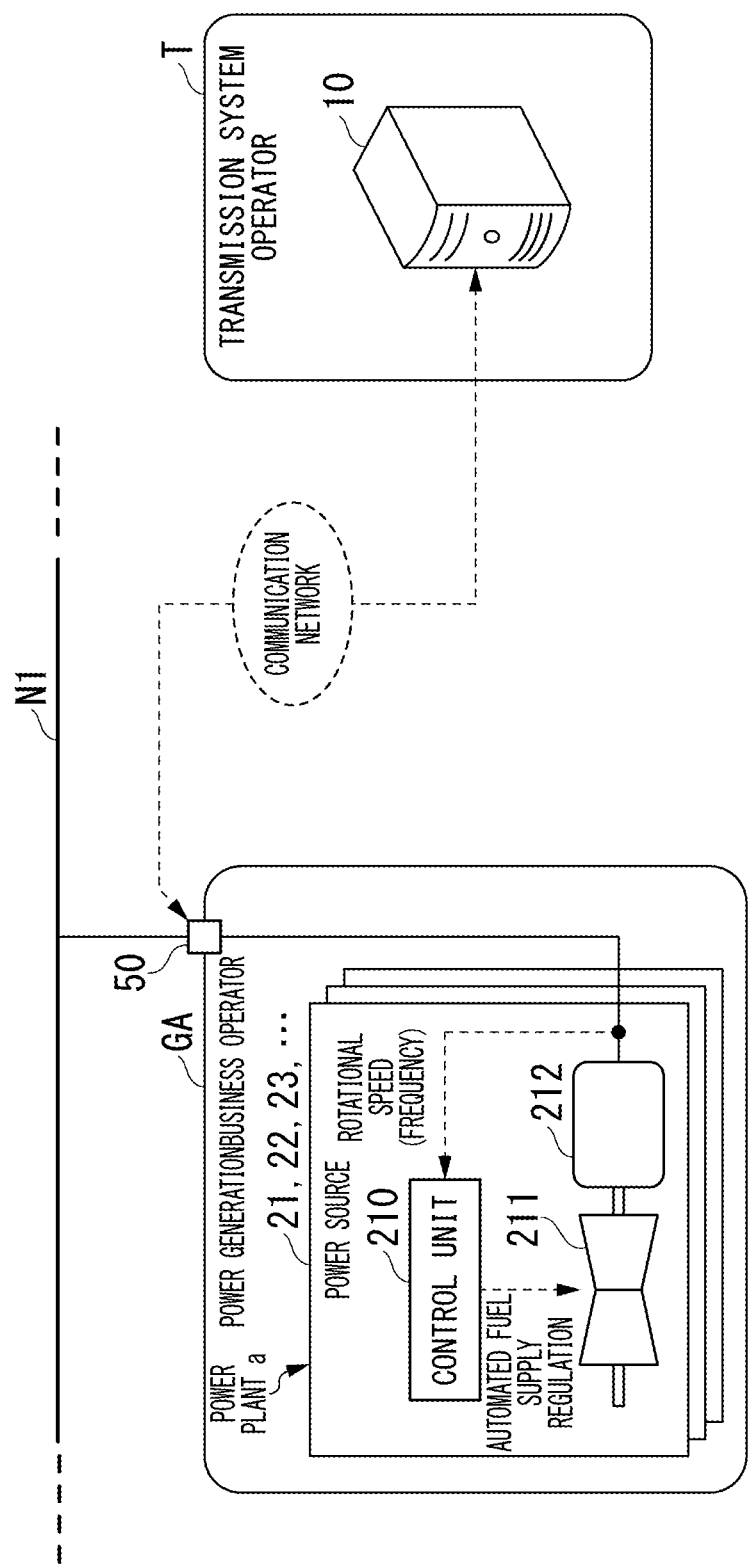
FIG. 2 is a diagram showing details of the configuration of the settlement system according to the first embodiment of the present disclosure.

FIG. 2 is a diagram showing details of a configuration of the settlement system according to the first embodiment of the present disclosure.

In FIG. 2, a configuration of a power plant a of the power generation business operator GA is shown as an example. Although the illustration is omitted, it is assumed that the power generation business operator GB also manages (or operates) a power plant b with a similar configuration.

The power plant a has a plurality of power sources 21, 22, 23, and the like.

Hereinafter, the power source 21 will be described as an example of the power sources 21, 22, 23, and the like of the power plant a. The configurations and functions of the power sources 22, 23, and the like are similar to those of the power source 21.

The power source 21 includes a control unit 210, a turbine device 211 (e.g., a gas turbine, a steam turbine, or the like), and a power generator 212.

The control unit 210 controls operations of the turbine device 211 and the power generator 212. For example, the control unit 210 continuously monitors a rotational speed (corresponding to an output frequency) of the power generator 212 and automatically regulates an amount of fuel or steam that is supplied to the turbine device 211 such that the uniform rotational speed is maintained (the governor free operation). According to this operation control, for example, when the load (power demand) increases within a short period and the rotational speed of the power generator 212 decreases, the control unit 210 immediately increases the amount of fuel or the like that is supplied to the turbine device 211 and compensates for the decrease in the rotational speed. The increment of the output needed for the power generator 212 to return to its original rotational speed is the "regulating power" provided by the power source 21 in correspondence with the increase in the above-described load (power demand) In this way, in relation to power demand fluctuation within a short period (a period of about 3 to 5 seconds), the regulating power is sequentially provided according to the governor free operation by the power source 21.

Hardware Configuration of Settlement Device

Figure 3:
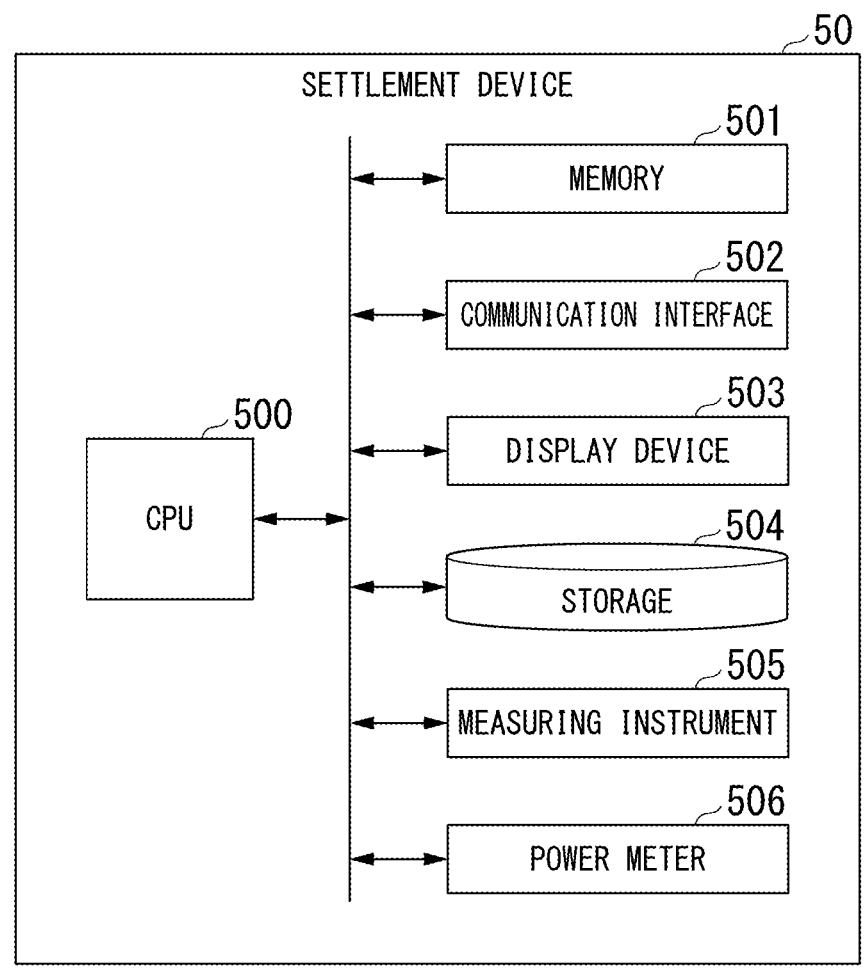
FIG. 3 is a block diagram showing a hardware configuration of the settlement device according to the first embodiment of the present disclosure.

FIG. 3 is a block diagram showing a hardware configuration of the settlement device according to the first embodiment of the present disclosure.

As shown in FIG. 3, the settlement device 50 includes a CPU 500, a memory 501, a communication interface 502, a display device 503, a storage 504, a measuring instrument 505, and a power meter 506.

The CPU 500 is a processor that controls the overall operation of the settlement device 50.

The memory 501 is a so-called main storage device, and instructions and data for the CPU 500 to operate on the basis of a program are loaded into the memory 501.

The communication interface 502 is an interface device for exchanging information with an external device (particularly, the server 10). In the present embodiment, communication means and methods implemented by the communication interface 502 are not particularly limited. For example, the communication interface 502 may be a wired connection interface for implementing wired communication or a wireless communication module for implementing wireless communication.

The display device 503 is a display device using a liquid crystal display, an organic EL display, or the like that displays a settlement result of the settlement device 50 or the like.

The storage 504 is a so-called auxiliary storage device, and may be, for example, a hard disk drive (HDD), a solid-state drive (SSD), or the like.

The measuring instrument 505 measures the active power transmitted or received at the connection point and the frequency at the connection point. For example, in the settlement device 50 installed at the connection point between the power source 21 and the target power transmission and distribution network N1, the measuring instrument 505 acquires a measured value of the active power output from the power source 21 to the target power transmission and distribution network N1 (hereinafter also referred to as a "measured active power value P") and a measured value of a frequency (hereinafter also referred to as a "measured frequency value f").

The power meter 506 measures an amount of power transmitted or received at the connection point. For example, in the settlement device 50 installed at the connection point between the power source 21 and the target power transmission and distribution network N1, the power meter 506 acquires an amount of power supplied from the power source 21 to the target power transmission and distribution network N1 (hereinafter referred to as an "amount of power W (kWh)"). Also, a power meter for measuring an amount of used or supplied electricity may be installed at the connection point. In this case, an existing power meter may be used as the power meter 506.

Functional Configuration of Settlement Device

Figure 4:
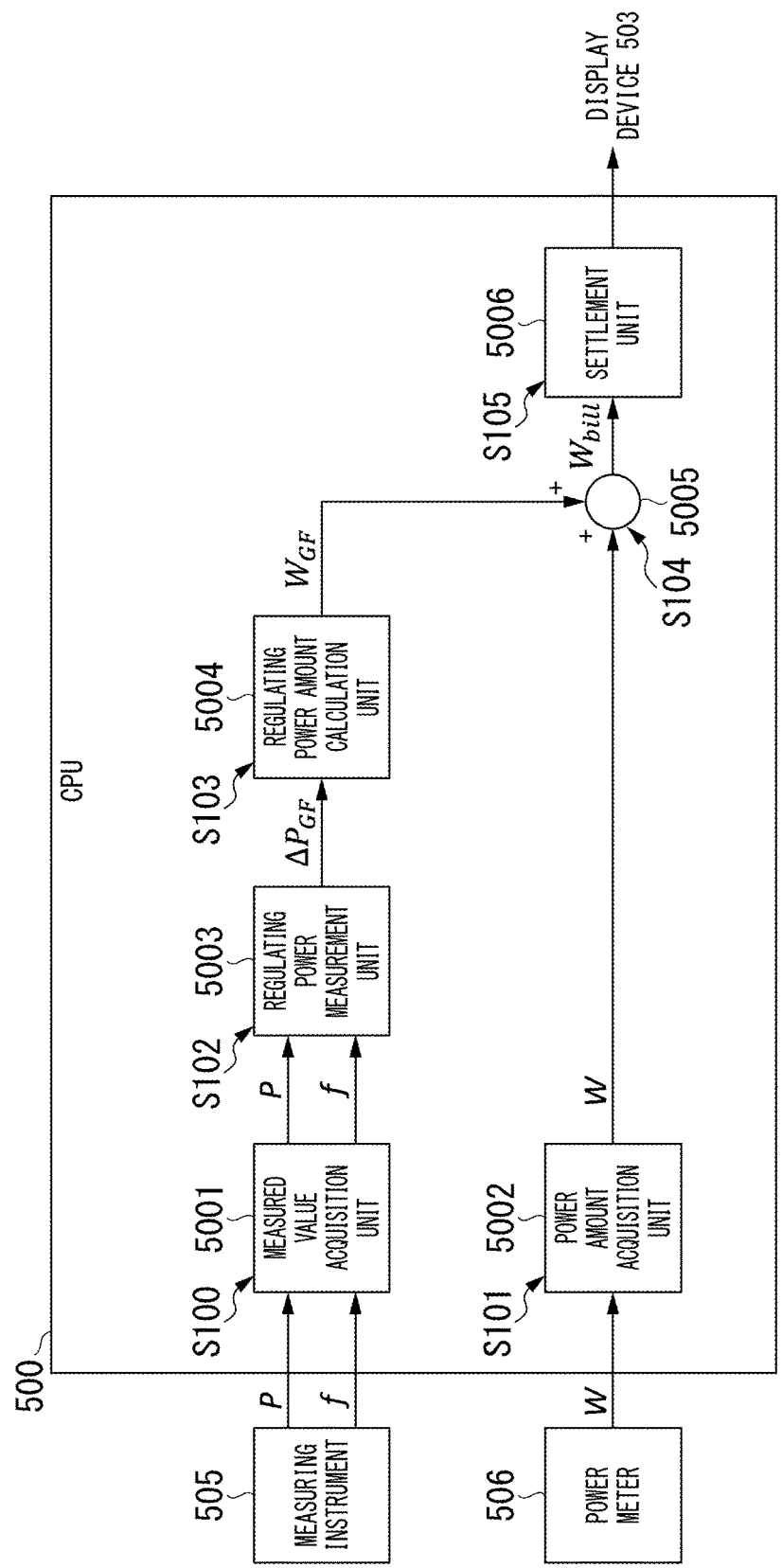
FIG. 4 is a block diagram showing a functional configuration of the settlement device according to the first embodiment of the present disclosure.

FIG. 4 is a block diagram showing the functional configuration of the settlement device according to the first embodiment of the present disclosure.

The functional configuration of the settlement device 50 according to the present embodiment will be described in detail below with reference to FIG. 4.

As shown in FIG. 4, the CPU 500 of the settlement device 50 operates in accordance with a program to exhibit functions of a measured value acquisition unit 5001, a power amount acquisition unit 5002, a regulating power measurement unit 5003, a regulating power amount calculation unit 5004, an addition unit 5005, and a settlement unit 5006.

The measured value acquisition unit 5001 acquires a measured value of active power (a measured active power value P (kW)) transmitted or received at the connection point and a measured value of frequency (a measured frequency value f (Hz)) at the connection point from the measuring instrument 505.

The power amount acquisition unit 5002 acquires the amount of power W (kWh) transmitted or received at the connection point for a prescribed period from the power meter 506.

The regulating power measurement unit 5003 measures regulating power $\Delta P_{GF}$ at the connection point on the basis of the acquired measured active power value P and the acquired measured frequency value f.

The regulating power amount calculation unit 5004 integrates the regulating power $\Delta P_{GF}$ over time and calculates an amount of regulating power $W_{GF}$ (kWh) for a prescribed period at the connection point.

The addition unit 5005 obtains a value $W_{bill}$ (kWh) by adding the amount of regulating power $W_{GF}$ for the prescribed period calculated by the regulating power amount calculation unit 5004 to the amount of power W for the prescribed period acquired by the power amount acquisition unit 5002.

The settlement unit 5006 settles compensation for the regulating power provided by the regulating power providing means and the power transmitted or received by the regulating power providing means on the basis of the sum $W_{bill}$ of the amount of regulating power $W_{GF}$ and the amount of power W. For example, when the regulating power providing means is the power source 21, the settlement unit 5006 settles both compensation for the regulating power due to the governor free operation of the power source 21 and compensation for the power supplied by the power source 21 to the target power transmission and distribution network N1 together.

Processing Flow of Settlement Device

Hereinafter, a processing flow of the settlement device 50 according to the present embodiment (a settlement method using the settlement device 50) will be described in detail with reference to FIG. 4.

Because the power (kW) for regulating the supply and demand of the power system becomes zero when integrated over time, it cannot be measured in simple integration. This is in contrast to the fact that the amount of used or supplied electricity (kWh) is simply measured with the power meter. In the supply and demand regulation, the power plant may mainly adjust an amount of power generation such that the uniform frequency of the power system (the target power transmission and distribution network N1) is maintained. Specifically, it is based on the governor free operation represented by Equation (1).

[Equation 1]

$$\Delta P = -\frac{1}{\delta}\frac{P_N}{f_N}\Delta f \quad (1)$$

In Equation (1), "$\Delta f$" is an excess of the frequency of the target power transmission and distribution network N1 relative to the reference value (e.g., "50 Hz," "60 Hz," or the like) and power generated in proportion thereto is decreased by "$\Delta P$." Here, "$P_N$" is a rated power generation output (kW) of the power generator 212, and "$f_N$" is a reference frequency (Hz). "$\delta$" is a value called a droop rate and the value is set in the control unit 210 of the power plant. Generally, a value of about 0.04 is set. This is used to designate a relationship between the excess $\Delta f$ for the reference frequency and the power $\Delta P$ to be reduced therefor. When the droop rate is "0.04," this indicates that $\Delta P$ is decreased by "$P_N$" when the frequency is increased by "$0.04 \times f_N$ (Hz)." For example, when the frequency is increases by "$0.04 \times f_N$ (2.4 Hz if the reference frequency is 60 Hz)" during an operation at the rated electrical output, a regulation process is performed such that the power generation output is decreased to "0." The uniform frequency of the target power transmission and distribution network N1 is maintained when the power plant regulates power generation sharply in this way.

The management of the power generation business operator G is mainly based on compensation for the supply of power. The main compensation is associated with the amount of power (kWh). This is a value obtained by integrating power (kW) transmitted by the power plant to the target power transmission and distribution network N1 over time. The power transmitted to the target power transmission and distribution network N1 is the active power measured at the connection point between the power plant and the target power transmission and distribution network N1.

Here, as shown in FIG. 1, two power generation business operators GA and GB are considered. It is assumed that the power generation business operator GA manages (or operates) the power plant a and that the power plant a is regulating supply and demand according to Equation (1) (the governor free operation). It is assumed that the power generation business operator GB manages (or operates) the power plant b and that the power plant b is not regulating supply and demand according to the governor free operation. It is assumed that the power plant a and the power plant b are located in a region where the reference frequency is "60 Hz" and are close to each other, and the frequency of the power system is the same all the time. Also, rated outputs of the power plant a and the power plant b are assumed to be 100 kW.

Figure 5:
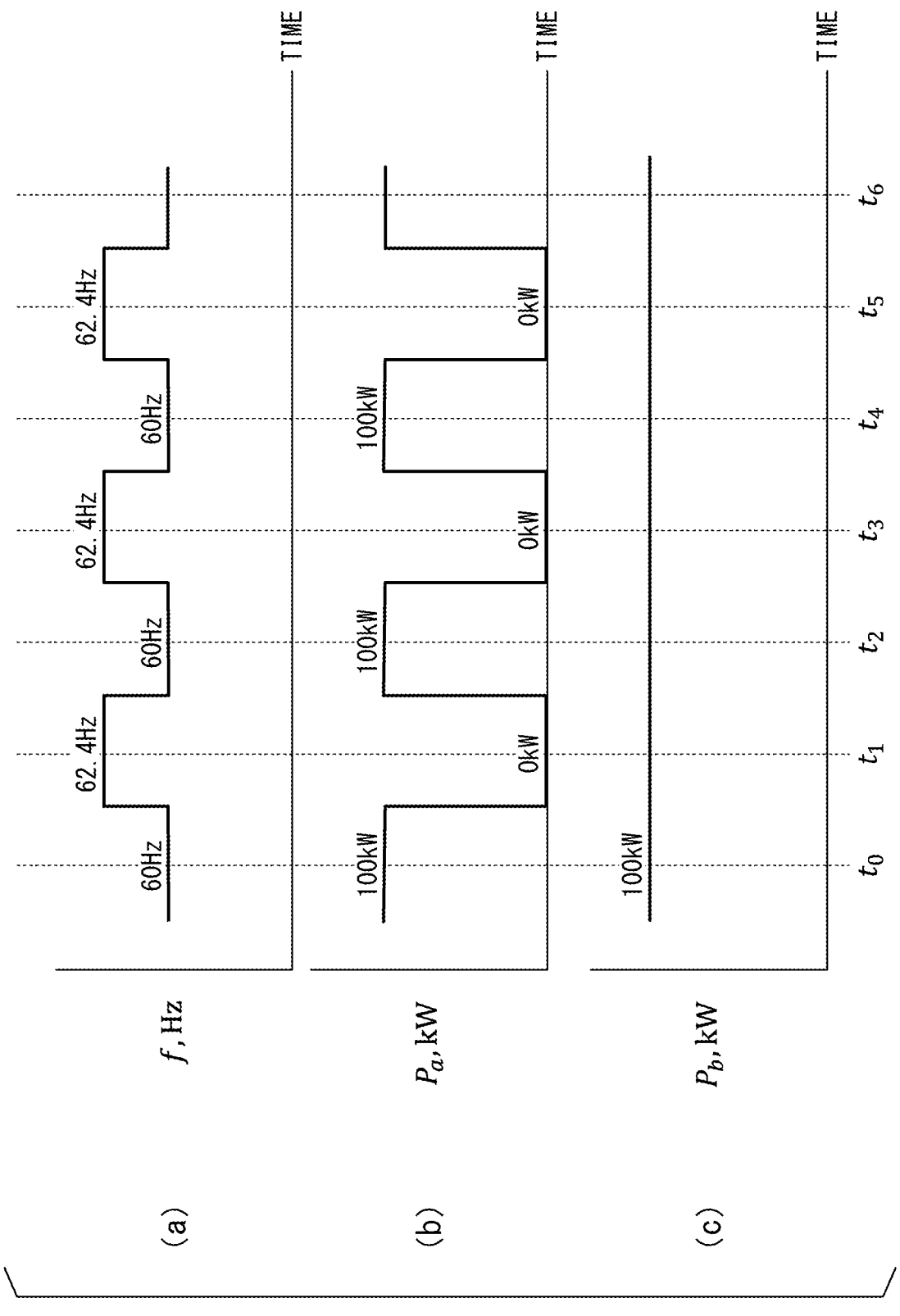
FIG. 5 is a first diagram for describing a function of the settlement device according to the first embodiment of the present disclosure.

FIG. 5 is a first diagram for describing a function of the settlement device according to the first embodiment of the present disclosure.

FIG. 6 is a second diagram for describing a function of the settlement device according to the first embodiment of the present disclosure.

(a) of FIG. 5 shows a time history of a measured frequency value f (Hz) of the target power transmission and distribution network N1 to which the power sources of the power plant a and the power plant b are connected. (b) of FIG. 5 is a time history of active power $P_a$ (kW) transmitted by the power plant a to the target transmission and distribution network N1, and (c) of FIG. 5 is active power $P_b$ (kW) transmitted by the power plant b to the target power transmission and distribution network N1.

Also, FIG. 6 shows a table of a time history of the measured frequency value f shown in FIG. 5 and a time history of the measured active power values P ($P_a$, $P_b$), of the power plants a and b, regulating power $\Delta P_{GF}$ ($\Delta P_{GFa}$, $\Delta P_{GFb}$), and regulating power $\Delta W_{GF}$ ($\Delta W_{GFa}$, $\Delta W_{GFb}$).

As shown in FIGS. 5 and 6, each of the power plant a and the power plant b is operating at the rated output ("100 kW") at time $t_0$ and the frequency at time $t_1$ is raised from "60 Hz" to "62.4 Hz" by "2.4 Hz." At this time, the active power $P_a$ transmitted by the power plant a is decreased to "0 kW" in accordance with Equation (1). On the other hand, the active power $P_b$ transmitted by the power plant b remains "100 kW." Subsequently, it is assumed that the frequency reciprocates between "60 Hz" and "62.4 Hz" at the times that are shown. At this time, the amount of power from time $t_0$ to time $t_6$ (the amount of power supplied to the target power transmission and distribution network N1) is "100 kW×(($t_1-t_0$)+($t_3-t_2$)+($t_6-t_5$))/($t_6-t_0$)" for the power plant a. If intervals between times $t_0, t_1, t_2, \ldots, t_6$ are equal, the amount of power generated by power plant a is "50 kW×($t_6-t_0$)." On the other hand, the amount of power of the power plant b is "100 kW×($t_6-t_0$)" that is twice that of the power plant a. If supply and demand regulation is performed in this way, it is difficult for the power plant a to obtain compensation originally obtained for the amount of power (the amount of supply) sent to the target power transmission and distribution network N1. On the other hand, the power plant b, which has continued to operate at the full output regardless of the supply and demand regulation, obtains the maximum compensation. This is clearly absurd.

In order to eliminate the irrationality, the settlement device 50 according to the present embodiment measures the regulating power produced by the power plant a in units of kW. Because the unit is power (kW), "regulating power" is hereinafter referred to as "regulating (electric) power." The settlement device 50 according to the present embodiment integrates the measured regulating power over time and performs a settlement process for the integrated measured regulating power in an amount of power (kWh). Because the amount of power (kWh) is currently the most common unit for buying and selling power, it is more advantageous to integrate into a buying and selling system based on the existing amount of power (kWh) than to establish a new system for buying and selling regulating power in terms of cost.

A specific processing flow of the settlement device 50 will be described. As shown in FIG. 4, first, the measured value acquisition unit 5001 acquires a measured active power value P and a measured frequency value f at the connection point from the measuring instrument 505 at each time ($t_0, t_1, \ldots$) (S100). Also, the power amount acquisition unit 5002 acquires an amount of power W at the connection point from the power meter 506 (S101).

Subsequently, the regulating power measurement unit 5003 measures regulating power (kW) at each time on the basis of the acquired measured active power value P and the acquired measured frequency value f (S102). Specifically, the regulating power measurement unit 5003 counts positive regulating power if the measured active power value P transmitted from the connection point to the target power transmission and distribution network N1 increases temporally when the measured frequency value f at the connection point decreases temporally. In contrast, the regulating power measurement unit 5003 counts negative regulating power if the same measured active power value P decreases temporally when the same measured frequency value f decreases temporally. In summary, if the regulating power at time t is denoted by $\Delta P_{GF}(t)$, its calculation follows Equation (2).

[Equation 2]

$$\Delta P_{GF}(t) = -\text{sgn}(f(t)-f(t-\Delta T))\cdot(P(t)-P(t-\Delta T)) \quad (2)$$

Here, "$\Delta T$" denotes a measurement sampling interval (h). "sgn(x)" denotes a sign function, a value of the function is "1" when an input x is "positive," the value of the function is "−1" when the input x is "negative," and the value of the function is "0" when the input x is "0." The measurement for regulating power (kW) is not limited to Equation (2). For example, the following Equations (2A) to (2C) may be used.

[Equation 2A]

$$\Delta P_{GF}(t) = -\text{sgn}(f(t)-f(t-\Delta T))\cdot\left(P(t)-P(t-\Delta T)\frac{f(t)}{f(t-\Delta T)}\right) \quad (2A)$$

[Equation 2B]

$$\Delta P_{GF}(t) = -\frac{\text{Cov}(P(t)-P(t-\Delta T),\, f(t)-f(t-\Delta T))}{\text{Var}(f(t)-f(t-\Delta T))} E(|f(t)-f(t-\Delta T)|) \quad (2B)$$

[Equation 2C]

$$\Delta P_{GF}(t) = -\frac{\text{Cov}\left(P(t)-P(t-\Delta T)\frac{f(t)}{f(t-\Delta T)},\, f(t)-f(t-\Delta T)\right)}{\text{Var}(f(t)-f(t-\Delta T))} E(|f(t)-f(t-\Delta T)|) \quad (2C)$$

In Equation (2C), "Cov" denotes covariance and "Var" denotes variance.

Subsequently, the regulating power amount calculation unit 5004 obtains how much regulating power the power plant a has produced in a prescribed period (S103). The sum of the regulating power (kW) over time is called the amount of regulating power $W_{GF}$ (kWh). If an integral is performed at given time intervals $\Delta T$, the amount of regulating power $W_{GF}(t)$ is expressed by Equation (3).

[Equation 3]

$$W_{GF}(t) = \sum_\tau \Delta P_{GF}(\tau)\Delta T \quad (3)$$

At the time of application to FIG. 6, the regulating power $\Delta P_{GFa}$ of the power plant a during a period from time $t_0$ to time $t_6$ is "600 kWh." On the other hand, the regulating power $\Delta P_{GFb}$ of the power plant b during the same period is "0 kWh." That is, the regulating power of the power plant a is converted into an amount of power (an amount of regulating power $W_{GFa}$).

Subsequently, the addition unit 5005 adds the amount of regulating power $W_{GF}(t)$ for a prescribed period (for example, $\Delta T$) calculated by the regulating power amount calculation unit 5004 to the amount of power W(t) for the same period acquired by the power amount acquisition unit 5002 to obtain a settled amount of power $W_{bill}(t)$ (S104).

The settlement unit 5006 settles compensation for the power plant a on the basis of the settled amount of power $W_{bill}(t)$ (S105). In this way, the power plant a that has produced the regulating power can obtain both compensation corresponding to the amount of power W(t) that has been transmitted and compensation corresponding to the amount of regulating power $W_{GFa}$ in a power amount-based mechanism by performing a settlement process on the basis of the integrated amount of regulating power $W_{bill}(t)$ including the amount of regulating power $W_{GF}(t)$. A settlement result of the settlement unit 5006 is displayed on the display device 503 and can be confirmed by the power generation business operator GA who manages the power plant a. Also, the settlement result is transmitted to the server 10 of the transmission system operator T via the communication interface 502. The transmission system operator T pays the compensation for each power generation business operator GA on the basis of the settlement result. Also, the settlement device 50 provided at the connection point between the power plant b and the target power transmission and distribution network N1 also performs a settlement process for the compensation associated with the power plant b by performing a process similar to that described above.

Operation and Effects

As described above, the settlement method according to the present embodiment (The settlement device 50 or the settlement system 1 including the settlement device 50 is also included. The same is true hereinafter) includes measuring the regulating power $\Delta P_{GF}$ of the regulating power providing means (for example, the power source 21 of the power plant a) on the basis of the measured active power value P and the measured frequency value f at the connection point and settling compensation transmitted or received by the regulating power providing means on the basis of a sum $W_{bill}$ of the amount of regulating power $W_{GF}$ obtained by integrating the regulating power $\Delta P_{GF}$ over time and the amount of power W transmitted or received by the regulating power providing means.

Consequently, the settlement device 50 can settle both the compensation corresponding to the amount of power transmitted or received by the regulating power providing means and the compensation corresponding to the regulating power of power supply and demand.

Furthermore, even if the supply and demand regulation is autonomous and is voluntary without depending on the instruction of the transmission system operator T, the compensation is obtained in the compensation method according to the present embodiment. Moreover, because the compensation can be paid by the power amount-based settlement system that is already established and the cost for constructing a new system and the cost for maintaining the new system are unnecessary, there is a great advantage for society as a whole.

Although an example of a mode in which the power generation business operator G produces regulating power through the governor free operation has been described in the present embodiment, the present disclosure is not limited thereto. In another embodiment, the settlement device 50 may be configured to settle compensation for both an amount of power used by the consumer C and regulating power produced in a demand regulation process of the consumer C. Further, in still another embodiment, the settlement device 50 may be configured to settle compensation for both an amount of power transmitted or received under the contract with the non-target power transmission and distribution network N2 managed (or operated) by another transmission system operator T and regulating power provided by the non-target power transmission and distribution network N2.

In this way, compensation for the supply and demand regulation process that is autonomously performed by the power generation business operator G, the consumer C, or another transmission system operator T is generated and a supply and demand regulation capability of the entire power system is enhanced when an incentive is given to the power supply and demand regulation. This enables the acceptance of a large amount of renewable energy in solar power generation or the like and will bring about overall societal benefits in terms of global warming countermeasures and the like.

Second Embodiment

Next, a settlement system 1 according to the second embodiment of the present disclosure will be described with reference to FIG. 7.

The same reference signs are given to components that are the same as those of the first embodiment and detailed description thereof will be omitted.

Functional Configuration of Settlement Device

Figure 7:
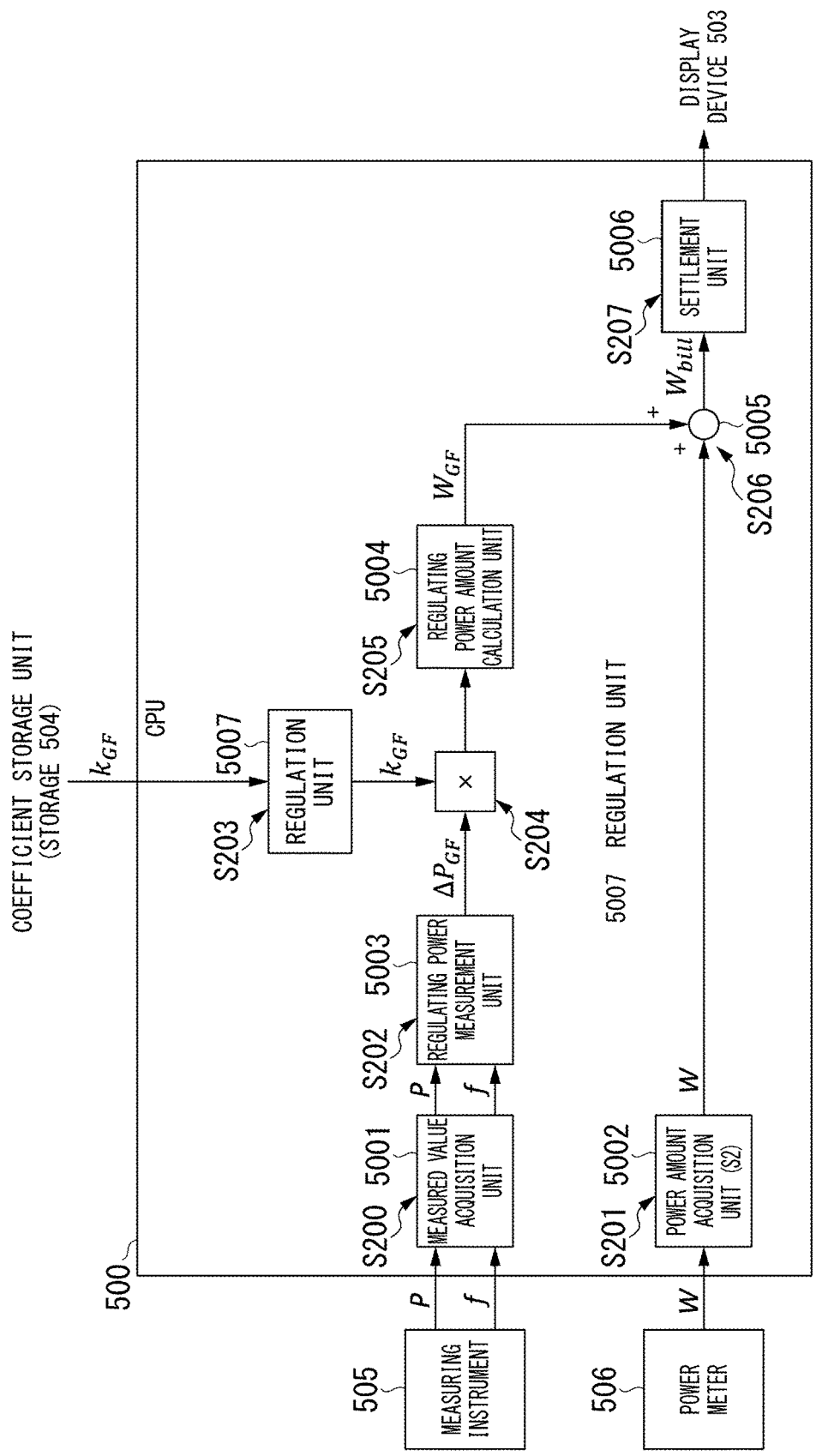
FIG. 7 is a block diagram showing a functional configuration of a settlement device according to a second embodiment of the present disclosure.

FIG. 7 is a block diagram showing a functional configuration of a settlement device according to the second embodiment of the present disclosure.

Hereinafter, a functional configuration of a settlement device 50 according to the present embodiment will be described in detail below with reference to FIG. 7.

As shown in FIG. 7, a CPU 500 of the settlement device 50 according to the present embodiment operates in accordance with a program, thereby further functioning as a regulation unit 5007.

The regulation unit 5007 multiplies regulating power $\Delta P_{GF}$ measured by the regulating power measurement unit 5003 by a price regulation coefficient $k_{GF}$ for regulating compensation for the regulating power. In the present embodiment, different values of the price regulation coefficient $k_{GF}$ are preset in accordance with a date and time and a corresponding table thereof is stored in a coefficient storage unit (a storage 504). The regulation unit 5007 acquires the price regulation coefficient $k_{GF}$ corresponding to the current date and time from the corresponding table of the coefficient storage unit and multiplies the regulating power $\Delta P_{GF}$ by the price regulation coefficient $k_{GF}$.

Also, the regulating power amount calculation unit 5004 according to the present embodiment calculates an amount of regulating power by integrating values obtained by multiplying the regulating power $\Delta P_{GF}$ by the price regulation coefficient $k_{GF}$.

Processing Flow of Settlement Device

Hereinafter, the processing flow of the settlement device 50 according to the present embodiment (the settlement method using the settlement device 50) will be described in detail with reference to FIG. 7.

In the present embodiment, processing steps S200, S201, and S202 of a measured value acquisition unit 5001, a power amount acquisition unit 5002, and a regulating power measurement unit 5003 are similar to processing steps S100, S101, and S102 (FIG. 4) in the first embodiment.

Subsequently, the regulation unit 5007 acquires the price regulation coefficient $k_{GF}$ corresponding to the current time from the coefficient storage unit (S203) and multiplies the regulating power $\Delta P_{GF}$ measured by the regulating power measurement unit 5003 by the price regulation coefficient $k_{GF}$ (S204). The regulating power amount calculation unit 5004 calculates an amount of regulating power $W_{GF}$ by integrating values obtained by multiplying the regulating power $\Delta P_{GF}$ by the price regulation coefficient $k_{GF}$ (S205).

For example, it is known that on weekdays, power consumption decreases at 12:00 and recovers at 13:00. In other words, there is large fluctuation in power supply and demand during this time period. In this time period, if the unit price of the amount of regulating power is preset to be particularly high, an incentive is given to regulating power production and the frequency fluctuation of the target power transmission and distribution network N1 is suppressed.

Specifically, from 12:00 to 13:00, the price of regulating power will be increased to 1.1 times the normal price and the price will be changed in accordance with the demand for regulating power. In the present embodiment, weighting corresponding to the date and time is performed by multiplying the regulating power $\Delta P_{GF}$ by the price regulation coefficient $k_{GF}$. For the price regulation coefficient $k_{GF}$, a value is predefined on the basis of, for example, a calendar and a timer, and it is looked up. Using the price regulation coefficient $k_{GF}$, the amount of regulating power is calculated by the following equation.

[Equation 4]

$$W_{GF}(t) = \sum_{\tau} \Delta P_{GF}(\tau) k_{GF}(\tau) \Delta T \quad (4)$$

The subsequent processing steps S206 and S207 of the addition unit 5005 and the settlement unit 5006 are similar to processing steps S104 and S105 (FIG. 4) in the first embodiment.

Operation and Effects

As described above, the settlement method according to the present embodiment includes calculating an amount of regulating power $W_{GF}$ by integrating values obtained by multiplying the measured regulating power $\Delta P_{GF}$ by the price regulation coefficient $k_{GF}$. Also, the price regulation coefficient $k_{GF}$ is preset to a value that differs in accordance with the date and time.

Consequently, it is possible to change compensation for an amount of regulating power in accordance with the power supply and demand. Also, when the power supply and demand fluctuate in accordance with the date and time, the compensation for the amount of regulating power can be changed in accordance with the fluctuation of the power supply and demand. For example, during a time period when a large amount of regulating power is required, an incentive for regulating power production is given by increasing the compensation for regulating power, such that it is possible to suppress frequency fluctuation in the target transmission and distribution network N1.

Third Embodiment

Next, a settlement system 1 according to a third embodiment of the present disclosure will be described with reference to FIGS. 8 and 9.

The same reference signs are given to components that are the same as those of the first and second embodiments and detailed description thereof will be omitted.

Hardware Configuration of Server

Figure 8:
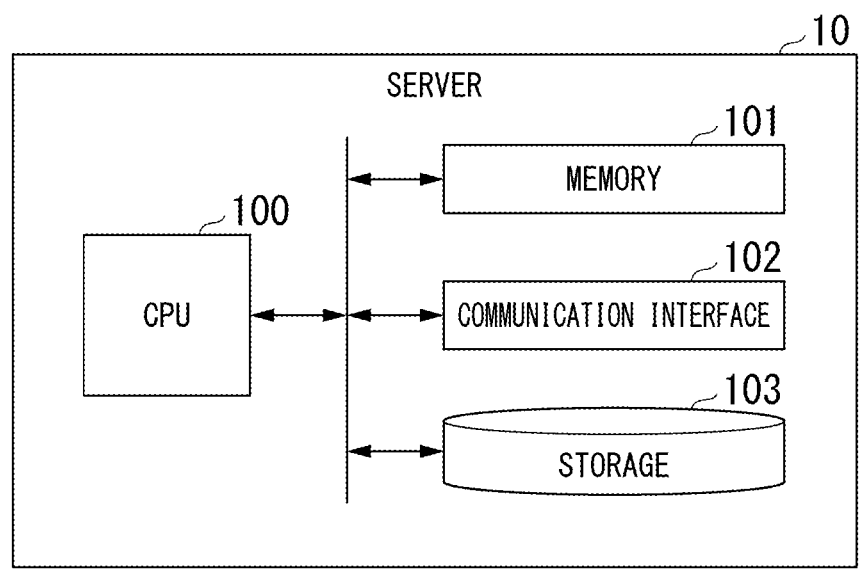
FIG. 8 is a block diagram showing a hardware configuration of a server according to a third embodiment of the present disclosure.

FIG. 8 is a block diagram showing a hardware configuration of a server according to the third embodiment of the present disclosure.

As shown in FIG. 8, a server 10 includes a CPU 100, a memory 101, a communication interface 102, and a storage 103.

The CPU 100 is a processor that controls the overall operation of the server 10.

The memory 101 is a so-called main storage device, and instructions and data for the CPU 100 to operate on the basis of a program are loaded into the memory 101.

The communication interface 102 is an interface device for exchanging information with an external device (particularly, a settlement device 50). Also, in the present embodiment, communication means and methods implemented by the communication interface 102 are not particularly limited. For example, the communication interface 102 may be a wired connection interface for implementing wired communication or a wireless communication module for implementing wireless communication.

The storage 103 is a so-called auxiliary storage device, and may be, for example, a hard disk drive (HDD), a solid-state drive (SSD), or the like.

Functional Configurations of Server and Settlement Device

Figure 9:
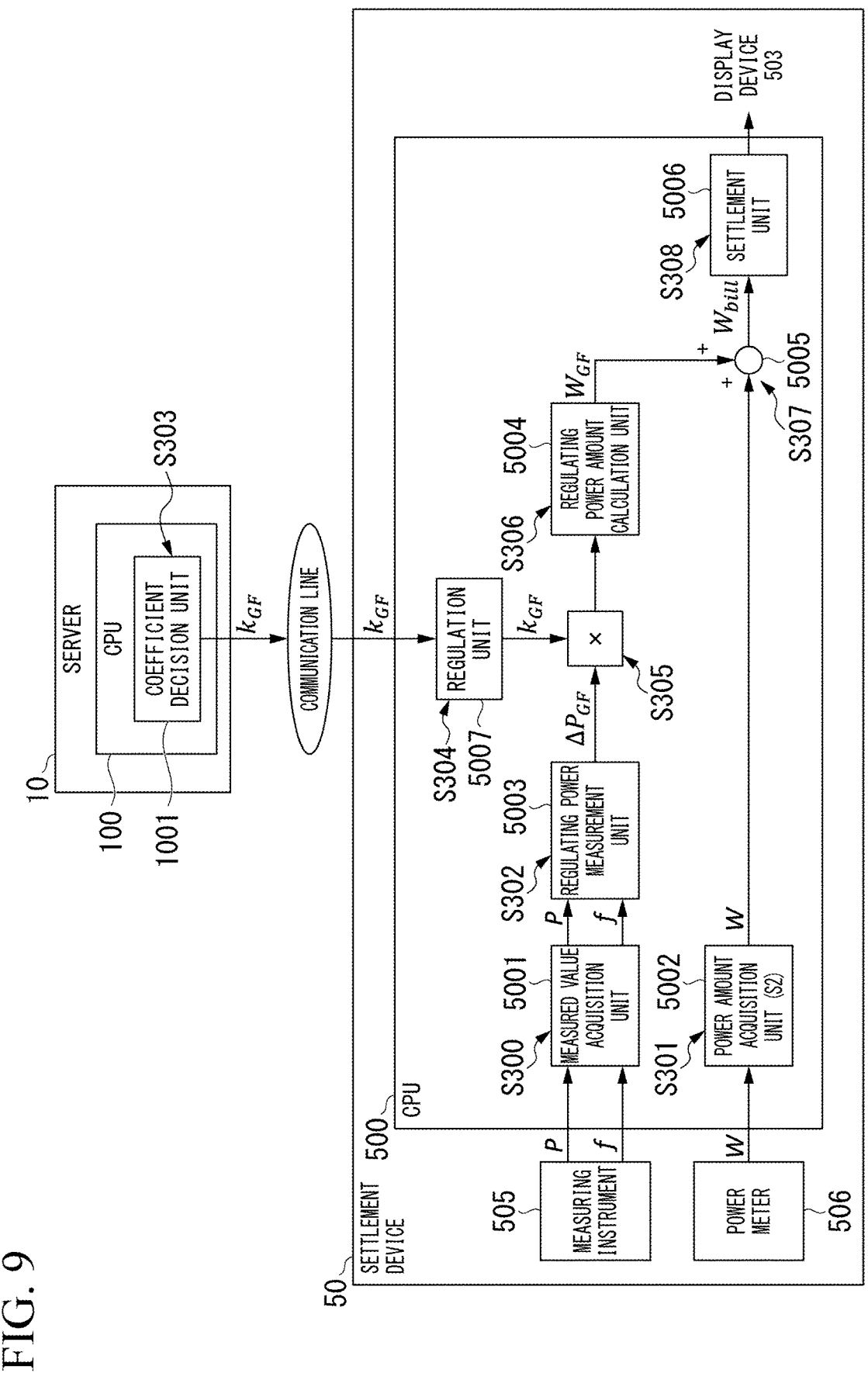
FIG. 9 is a block diagram showing functional configurations of a server and a settlement device according to the third embodiment of the present disclosure.

FIG. 9 is a block diagram showing functional configurations of a server and a settlement device according to the third embodiment of the present disclosure.

The functional configurations of the server 10 and the settlement device 50 according to the present embodiment will be described in detail below with reference to FIG. 9.

Unlike the second embodiment, in the settlement device 50 according to the present embodiment, a regulation unit 5007 acquires (receives) a price regulation coefficient $k_{GF}$ from the server 10 instead of the coefficient storage unit (the storage 504). Other functional units are similar to those of the second embodiment.

The CPU 100 of the server 10 functions as a coefficient decision unit 1001 by performing an operation in accordance with the program. The coefficient decision unit 1001 decides on the price regulation coefficient $k_{GF}$ corresponding to each region in accordance with power supply and demand of each region. The price regulation coefficient $k_{GF}$ decided on by the coefficient decision unit 1001 is transmitted to the settlement device 50 via a communication line.

Processing Flow of Settlement Device

Hereinafter, the processing flow of the settlement device 50 according to the present embodiment (the settlement method using the settlement device 50) will be described in detail with reference to FIG. 7.

In the present embodiment, processing steps S300, S301, and S302 of a measured value acquisition unit 5001, a power amount acquisition unit 5002, and a regulating power measurement unit 5003 are similar to processing steps S200, S201, and S202 (FIG. 7) in the second embodiment.

In the second embodiment, the case where the power demand fluctuation situation changes with a time period has been described. In addition to the time period, there is a regional difference in power supply and demand fluctuations. Because a target transmission and distribution network N1 has capacity constraints, if there is an imbalance between power supply and demand in a certain region, it is desirable to regulate the imbalance in the region or nearby. Therefore, convenience is improved if the price regulation coefficient $k_{GF}$ can be set for each region. This is because if the price regulation coefficient $k_{GF}$ is set large only in a region where there is a large supply-demand imbalance, an incentive for regulating power production will be given, which will help eliminate the imbalance.

Therefore, in the server 10 according to the present embodiment, the coefficient decision unit 1001 decides on the price regulation coefficient $k_{GF}$ for each region (step S303). Specifically, the coefficient decision unit 1001 acquires and monitors a measured frequency value f at each connection point via the communication line. For example, the coefficient decision unit 1001 decides on the price regulation coefficient $k_{GF}$ such that the compensation for the regulating power increases as the variance of the measured frequency value f increases. The decided price regulation coefficient $k_{GF}$ is transmitted to the settlement device 50 via the communication line. The coefficient decision unit 1001 predefines a value of the price regulation coefficient $k_{GF}$ corresponding to the variance and automatically decides on and transmits the price regulation coefficient $k_{GF}$. Also, the coefficient decision unit 1001 may receive an input operation by an administrator to decide on and transmit the price regulation coefficient $k_{GF}$.

Subsequently, the regulation unit 5007 receives the price regulation coefficient $k_{GF}$ from the server 10 of the transmission system operator T (S304) and multiplies regulating power $\Delta P_{GF}$ by the price regulation coefficient $k_{GF}$ (S305). The regulating power amount calculation unit 5004 calculates an amount of regulating power $W_{GF}$ by integrating values obtained by multiplying the regulating power $\Delta P_{GF}$ by the price regulation coefficient $k_{GF}$ (S306).

The subsequent processing steps S307 and S308 of the addition unit 5005 and the settlement unit 5006 are similar to processing steps S206 and S207 (FIG. 7) of the second embodiment.

Operation and Effects

As described above, the settlement method according to the present embodiment includes calculating the amount of regulating power $W_{GF}$ by integrating values obtained by multiplying the measured regulating power $\Delta P_{GF}$ by the price regulation coefficient $k_{GF}$ acquired from the server 10 of the transmission system operator T.

Consequently, the transmission system operator T can change the price regulation coefficient according to supply and demand fluctuations and regulate the incentive for regulating power calculation.

Also, it is possible to regulate the supply and demand balance for each region by changing the price regulation coefficient $k_{GF}$ in accordance with the power supply and demand for each region. For example, by setting a large price regulation coefficient $k_{GF}$ in a region with a large supply-demand imbalance, an incentive for regulating power production is given and it is possible to contribute to eliminating the imbalance.

Fourth Embodiment

Next, a settlement system 1 according to a fourth embodiment of the present disclosure will be described with reference to FIGS. 10 to 12.

The same reference signs are given to components that are the same as those of the first to third embodiments and detailed descriptions thereof will be omitted.

Functional Configuration of Settlement Device

Figure 10:
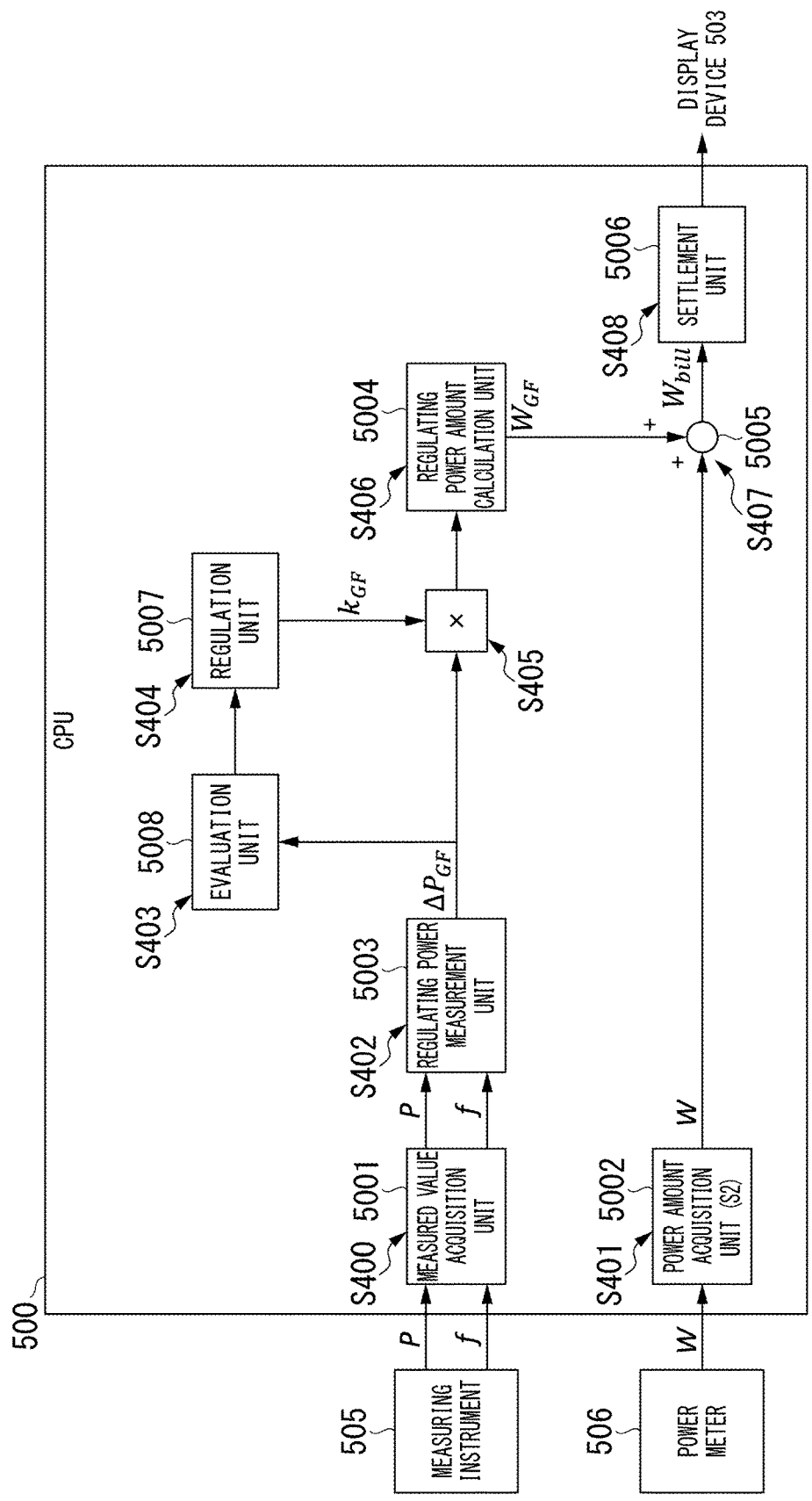
FIG. 10 is a block diagram showing a functional configuration of a settlement device according to a fourth embodiment of the present disclosure.

FIG. 10 is a block diagram showing a functional configuration of a settlement device according to a fourth embodiment of the present disclosure.

A functional configuration of a settlement device 50 according to the present embodiment will be described in detail below with reference to FIG. 10. Here, a settlement device 50 installed at a connection point associated with a power plant a will be described as an example As shown in FIG. 10, a CPU 500 of the settlement device 50 according to the present embodiment operates in accordance with a program, thereby further functioning as an evaluation unit 5008.

An evaluation unit 5008 evaluates the stationarity of regulating power of a regulating power providing means.

Also, a regulation unit 5007 according to the present embodiment changes a price regulation coefficient $k_{GF}$ according to an evaluation result of the evaluation unit 5008.

Processing Flow of Settlement Device

Figure 11:
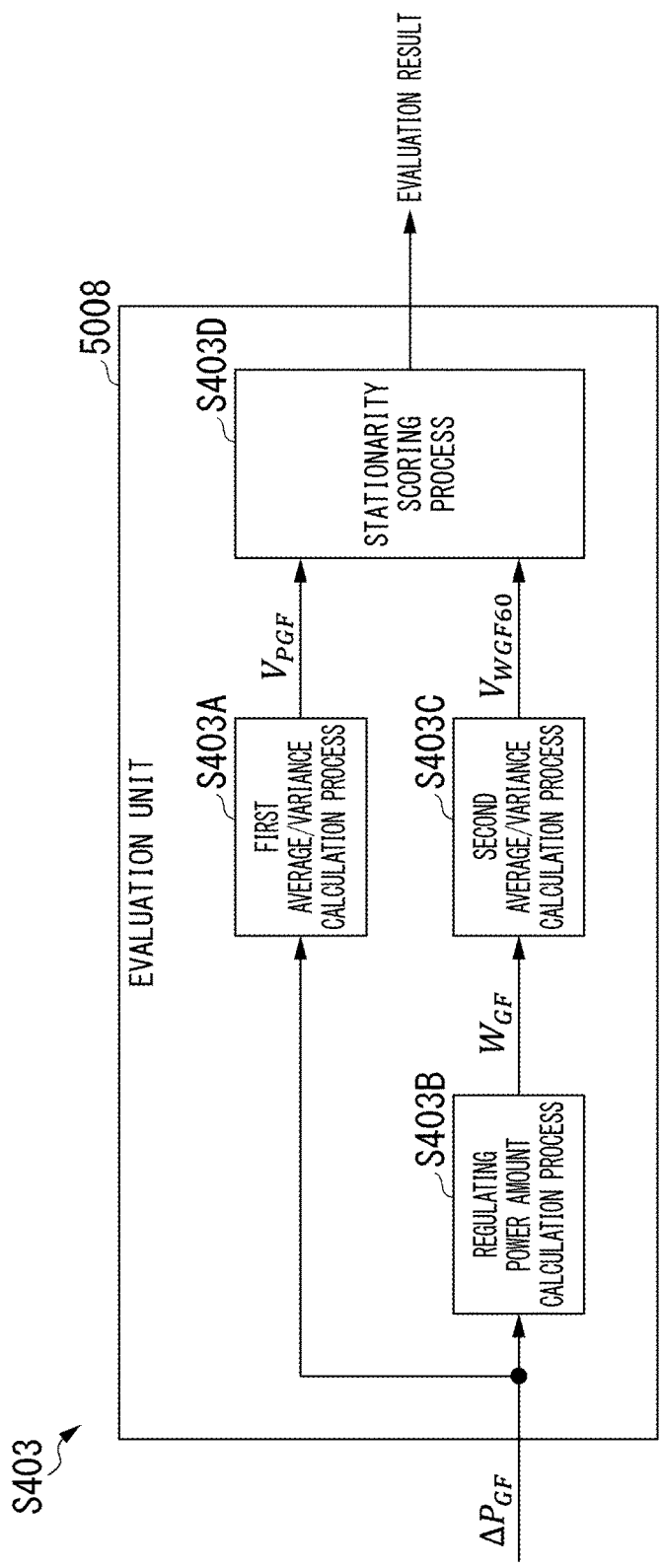
FIG. 11 is a block diagram showing a functional configuration of an evaluation unit according to the fourth embodiment of the present disclosure.

FIG. 11 is a block diagram showing a functional configuration of an evaluation unit according to the fourth embodiment of the present disclosure.

A processing flow of the settlement device 50 according to the present embodiment (a settlement method using the settlement device 50) will be described in detail below with reference to FIGS. 10 and 11.

In the first to third embodiments, a method in which each power plant autonomously supplies the amount of regulating power, measures the amount of regulating power that has been supplied, and performs a settlement process for the measured amount of regulating power has been described. This is assumed on the commodity nature of power. As is often said, power has a character difficult to be stored. Instantaneous regulating power of a governor free operation or the like tends to have such a character. Thus, it is important to enhance the reserve regulating power. For example, let's say that an amount of power generation drops sharply due to a cumulonimbus cloud in huge solar power generation. The resulting supply shortage will be compensated for by other power plants immediately supplying regulating power. It has to be done in an instant or less than a second and it is actually being done. After 1 minute, it is too late and useless.

The true value of the reserve regulating power cannot be known because it is a potential value that is not normally used. Therefore, we can only guess. For example, the stationarity of production of regulating power or the like is given as the effective estimation. It is not difficult to perform a scoring process for the stationarity of reserve power production of each day, hour, minute, or second with statistics such as an average and variance. Therefore, compensation according to stationarity would give power plants an incentive for regulating power production in a stationary way, resulting in enhance reserve regulating power. The present embodiment creates the technical infrastructure, and is configured as follows.

First, as shown in FIG. 10, a measured value acquisition unit 5001 acquires the measured frequency value f and the measured active power value P at the connection point associated with the power plant a from a measuring instrument 505 (S400). Also, the power amount acquisition unit 5002 acquires an amount of power W transmitted or received at the connection point associated with the power plant a from a power meter 506 (S401).

A regulating power measurement unit 5003 measures regulating power $\Delta P_{GF}$ at each time according to Equation (1) (S402).

Subsequently, the evaluation unit 5008 evaluates the stationarity of the power plant a on the basis of the regulating power $\Delta P_{GF}$ (S403). Specifically, as shown in FIG. 11, the evaluation unit 5008 calculates variance $V_{PGF}$ as shown in Equation (5) for time-series data of the regulating power $\Delta P_{GF}$ at each time (S403A). E denotes an expected value.

[Equation 5]

$$V_{PGF}(t) = E((P_{GF}(t) - E(P_{GF}(t)))^2) \qquad (5)$$

Likewise, the evaluation unit 5008 calculates an amount of regulating power $W_{GF}$ for evaluation of a long-period component of the regulating power (S403B) and calculates variance with respect to the increment of each day, hour, minute, or second (S403C). For example, for the variance per minute, an increment $\Delta W_{GF60}$ per minute is calculated by Equation (6) and variance $V_{PGF60}$ is obtained by Equation (7).

[Equation 6]

$$\Delta W_{GF60}(t) = W_{GF}(t) - W_{GF}(t-60) \qquad (6)$$

[Equation 7]

$$V_{WGF60}(t) = E((\Delta W_{GF60}(t) - E(\Delta W_{GF60}(t)))^2) \qquad (7)$$

Subsequently, the evaluation unit 5008 performs a scoring process for the stationarity of the regulating power production of the power plant a (a power source 21) on the basis of $V_{PGF}$, $V_{WGF60}$, or the like (S403D). For example, the evaluation unit 5008 may evaluate a response speed of the power plant a on the basis of variance $V_{PGF}$ calculated by Equation (5) (S403A in FIG. 11). Also, the evaluation unit 5008 may evaluate whether or not the power plant a is constantly exhibiting regulating power on the basis of variance $V_{WGF60}$ calculated by Equations (6) to (7) (S403C in FIG. 11).

Subsequently, referring back to FIG. 10, the regulation unit 5007 changes a price regulation coefficient $k_{GF}$ on the basis of a stationarity evaluation result of the evaluation unit 5008 (S404). For example, the regulation unit 5007 sets the price regulation coefficient $k_{GF}$ higher as the stationarity of the power plant a is stronger (e.g., the power plant a exhibits more constant regulating power than the other power plant b). For example, the price regulation coefficient may be reduced in proportion to standard deviation, which is the square root of the variance $V_{WGF60}$, as in Equation (8). $\beta$ is a regulating coefficient.

[Equation 8]

$$k_{GF} \leftarrow k_{GF}\left(1 - \beta \frac{\sqrt{V_{WGF60}(t)}}{|E(\Delta W_{GF60}(t))|}\right) \qquad (8)$$

Also, the regulation unit 5007 multiplies the regulating power $\Delta P_{GF}$ measured by the regulating power measurement unit 5003 by the changed price regulation coefficient $k_{GF}$ (S405).

The subsequent processing steps S406, S407, and S408 of the regulating power amount calculation unit 5004, the addition unit 5005, and the settlement unit 5006 are similar to processing steps S205, S206, and S207 (FIG. 7) of the second embodiment.

MODIFIED EXAMPLES

Figure 12:
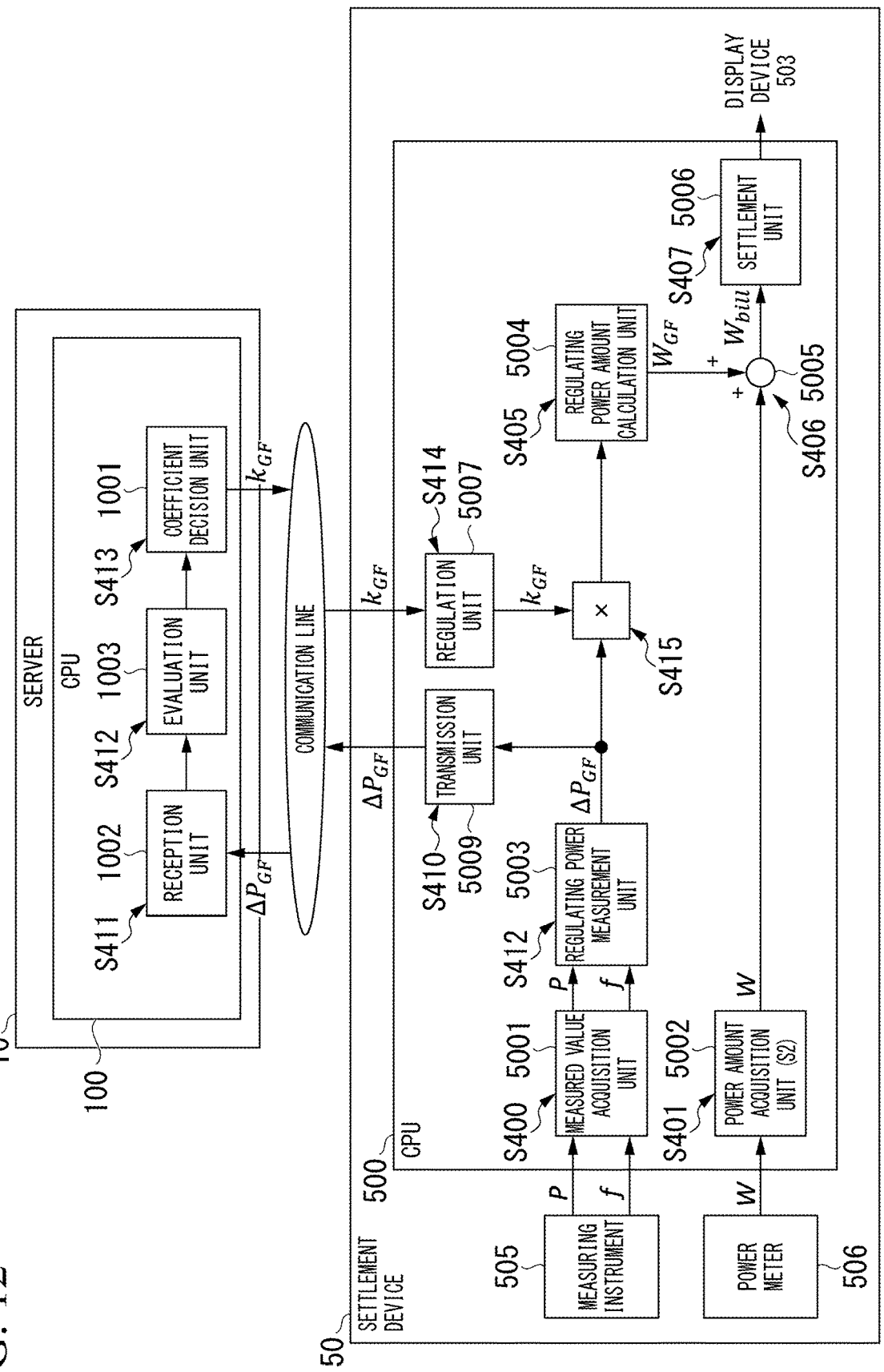
FIG. 12 is a block diagram showing functional configurations of a settlement device and a server according to a modified example of the fourth embodiment of the present disclosure.

FIG. 12 is a block diagram showing functional configurations of a settlement device and a server according to a modified example of the fourth embodiment of the present disclosure.

Although a mode in which the settlement device 50 evaluates the stationarity (having the evaluation unit 5008) has been described in the fourth embodiment, the present disclosure is not limited thereto. As in the present modified example (FIG. 12), a mode in which the server 10 of the transmission system operator T evaluates stationarity may be provided. Differences from the fourth embodiment will be described below with reference to FIG. 12. Although a case where the server 10 evaluates the stationarity of the power plant a will be described here, it is assumed that the server 10 similarly evaluates the other power plants.

As shown in FIG. 12, the CPU 500 of the settlement device 50 has a transmission unit 5009 instead of the evaluation unit 5008. The transmission unit 5009 transmits the regulating power $\Delta P_{GF}$ of the power plant a measured by the regulating power measurement unit 5003 to the server 10 via the communication line (S410).

Also, the CPU 100 of the server 10 further has a reception unit 1002 and an evaluation unit 1003. The reception unit 1002 receives the regulating power $\Delta P_{GF}$ of the power plant a from the settlement device 50 of the power plant a via the communication line (S411).

Subsequently, like the evaluation unit 5008 (FIG. 11) of the settlement device 50, the evaluation unit 1003 of the server 10 calculates variance $V_{PGF}$ as shown in Equation (5) with respect to time-series data of the regulating power $\Delta P_{GF}$ of the power plant a at each time (S403A).

Also, like the evaluation unit 5008 (FIG. 11) of the settlement device 50, the evaluation unit 1003 of the server 10 calculates an amount of regulating power $W_{GF}$ of the power plant a (S403B) and calculates an increment $\Delta W_{GF60}$ per minute, for example, by Equation (6), and obtains its variance $V_{PGF60}$ by Equation (7) (S403C).

Like the evaluation unit 5008 (FIG. 11) of the settlement device 50, the evaluation unit 1003 of the server 10 performs a scoring process for the stationarity of the regulating power output of the power plant a on the basis of $V_{PGF}$, $V_{WGF60}$, and the like (S403D).

Subsequently, the coefficient decision unit 1001 of the server 10 decides on the price regulation coefficient $k_{GF}$ of the power plant a on the basis of an evaluation result of the evaluation unit 1003 (S413). This processing step is similar to the processing step of the regulation unit 5007 of the settlement device 50 (S404 in FIG. 10).

The coefficient decision unit 1001 of the server 10 transmits the price regulation coefficient $k_{GF}$ of the power plant a to the settlement device 50 of the power plant a via the communication line. When the price regulation coefficient $k_{GF}$ is received (S414), the settlement device 50 outputs a value obtained by multiplying the regulating power PGF measured by the regulating power measurement unit 5003 by the received price regulation coefficient $k_{GF}$ to the regulating power amount calculation unit 5004 (S415). The subsequent processing steps are similar to those of the fourth embodiment.

Operation and Effects

As described above, the settlement method according to the present embodiment is characterized in that a scoring process is performed for the stationarity on the basis of the increments of the regulating power $\Delta P_{GF}$ and the amount of regulating power $W_{GF}$.

Consequently, it is possible to give a higher incentive to the regulating power providing means with higher stationarity than to the regulating power providing means with lower stationarity. For example, the regulating power providing means that provides regulating power quickly or the regulating power providing means that provides regulating power constantly can be given a higher incentive than other regulating power providing means. Thereby, the stability of the frequency in the target power transmission and distribution network N1 can be further improved.

Fifth Embodiment

Next, a settlement system 1 according to a fifth embodiment of the present disclosure will be described with reference to FIGS. 13 to 15.

The same reference signs are given to components that are the same as those of the first to fourth embodiments and detailed description thereof will be omitted.

Functional Configuration of Settlement Device

Figure 13:
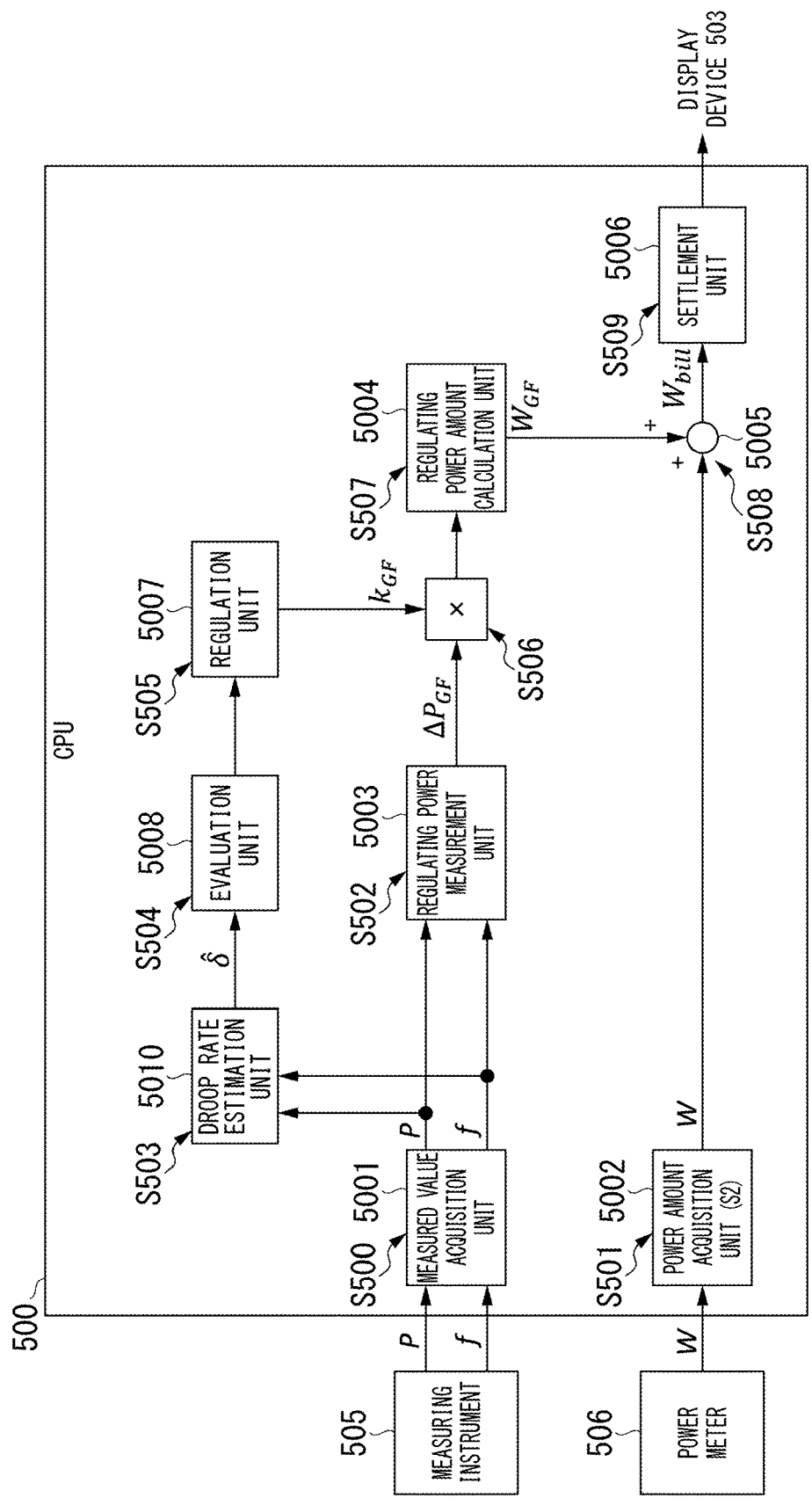
FIG. 13 is a block diagram showing a functional configuration of a settlement device according to a fifth embodiment of the present disclosure.

FIG. 13 is a block diagram showing a functional configuration of the settlement device according to the fifth embodiment of the present disclosure.

A functional configuration of a settlement device 50 according to the present embodiment will be described in detail below with reference to FIG. 13. Here, the settlement device 50 installed at a connection point associated with a power plant a will be described as an example.

As shown in FIG. 13, a CPU 500 of the settlement device 50 according to the present embodiment further functions as a droop rate estimation unit 5010 by operating according to a program.

The droop rate estimation unit 5010 estimates a droop rate $\hat{\delta}$ of the regulating power providing means on the basis of a measured active power value P and a measured frequency value f. Also, the notation "$\hat{\delta}$" in the specification corresponds to the notation in which a hat symbol "^" attached above "$\delta$" in the drawings and equations shown below.

Processing Flow of Settlement Device

Figure 14:
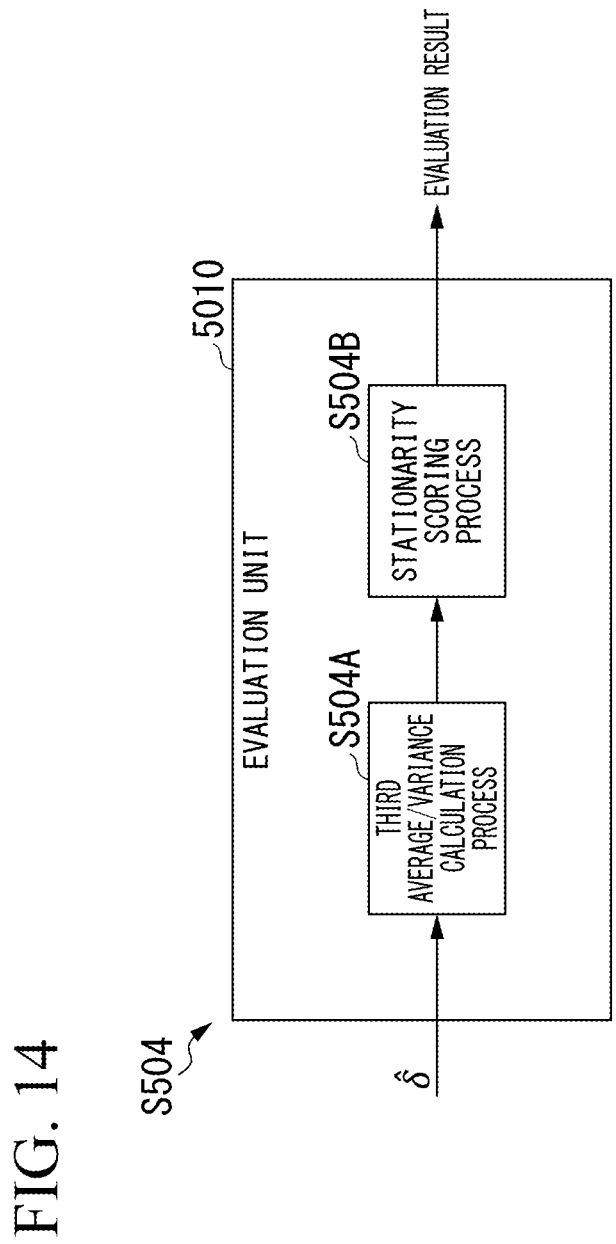
FIG. 14 is a block diagram showing a functional configuration of an evaluation unit according to the fifth embodiment of the present disclosure.

FIG. 14 is a block diagram showing a functional configuration of an evaluation unit according to the fifth embodiment of the present disclosure.

The processing flow of the settlement device 50 according to the present embodiment (the settlement method using the settlement device 50) will be described in detail below with reference to FIGS. 13 and 14.

The amplitude of the regulating power $\Delta P_{GF}$ depends on magnitudes of supply and demand fluctuations. Even if the same power plant is operated in the same way, the production of regulating power $\Delta P_{GF}$ also increases during a time period when the supply and demand fluctuations of the target transmission and distribution network N1 are large and the production of regulating power $\Delta P_{GF}$ also decreases during a time period when the supply and demand fluctuations are small in contrast. Thus, the variation in a value of an amount of regulating power $W_{GF}$ does not immediately imply that there is no stationarity. The selection of time periods in which the magnitudes of supply and demand fluctuations are about the same becomes a countermeasure. However, because a certain time period is cut out, generality is lost.

By using a correlation function between a frequency f and active power P as an index, the present embodiment alleviates the dependence on supply and demand fluctuations and more strictly evaluates the stationarity.

Specifically, as shown in FIG. 13, a measured value acquisition unit 5001 acquires a measured frequency value f and a measured active power value P at a connection point associated with a power plant a from a measuring instrument 505 (S500). Also, the power amount acquisition unit 5002 acquires an amount of power W transmitted or received at the connection point associated with the power plant a from a power meter 506 (S501). The regulating power measurement unit 5003 measures regulating power $\Delta P_{GF}$ of the power plant a at each time on the basis of the acquired measured frequency value f and the acquired measured active power value P (S502).

Next, the droop rate estimation unit 5010 estimates a droop rate of the power plant a using Equation (9) (S503). Equation (9) is derived from Equation (1) and a calculation process that is the same as that in estimating a droop rate $\delta$ from time-series data of the active power P and time-series data of the frequency f in the least squares method is performed. "Cov" denotes a correlation function and "Var" denotes variance.

[Equation 9]

$$\hat{\delta} = \frac{\text{Cov}(P, f)}{\text{Var}(P)} \frac{P_N}{f_N} \qquad (9)$$

Also, the evaluation unit 5008 evaluates the stationarity of the power plant a on the basis of a droop rate estimate $\hat{\delta}$ estimated by the droop rate estimation unit 5010 (S504). Specifically, as shown in FIG. 14, the evaluation unit 5008 calculates the variance between time-series values of the droop rate estimate $\hat{\delta}$ (S504A).

Subsequently, the evaluation unit 5008 performs a scoring process for the stationarity of the regulating power production of the power plant a on the basis of the variance between droop rate estimates $\hat{\delta}$ (S504B). For example, the evaluation unit 5008 performs a scoring process such that the score of the stationarity is higher when the droop rate estimate $\hat{\delta}$ is more stable (the variance is smaller).

Subsequently, referring back to FIG. 13, the regulation unit 5007 changes a price regulation coefficient $k_{GF}$ on the basis of the stationarity evaluation result of the evaluation unit 5008 (S505).

Also, the regulation unit 5007 multiplies the regulating power $\Delta P_{GF}$ measured by the regulating power measurement unit 5003 by the changed price regulation coefficient $k_{GF}$ (S506).

The subsequent processing steps S507, S508, and S509 of the regulating power amount calculation unit 5004, the addition unit 5005, and the settlement unit 5006 are similar to processing steps S205, S206, and S207 (FIG. 7) of the second embodiment.

MODIFIED EXAMPLES

Figure 15:
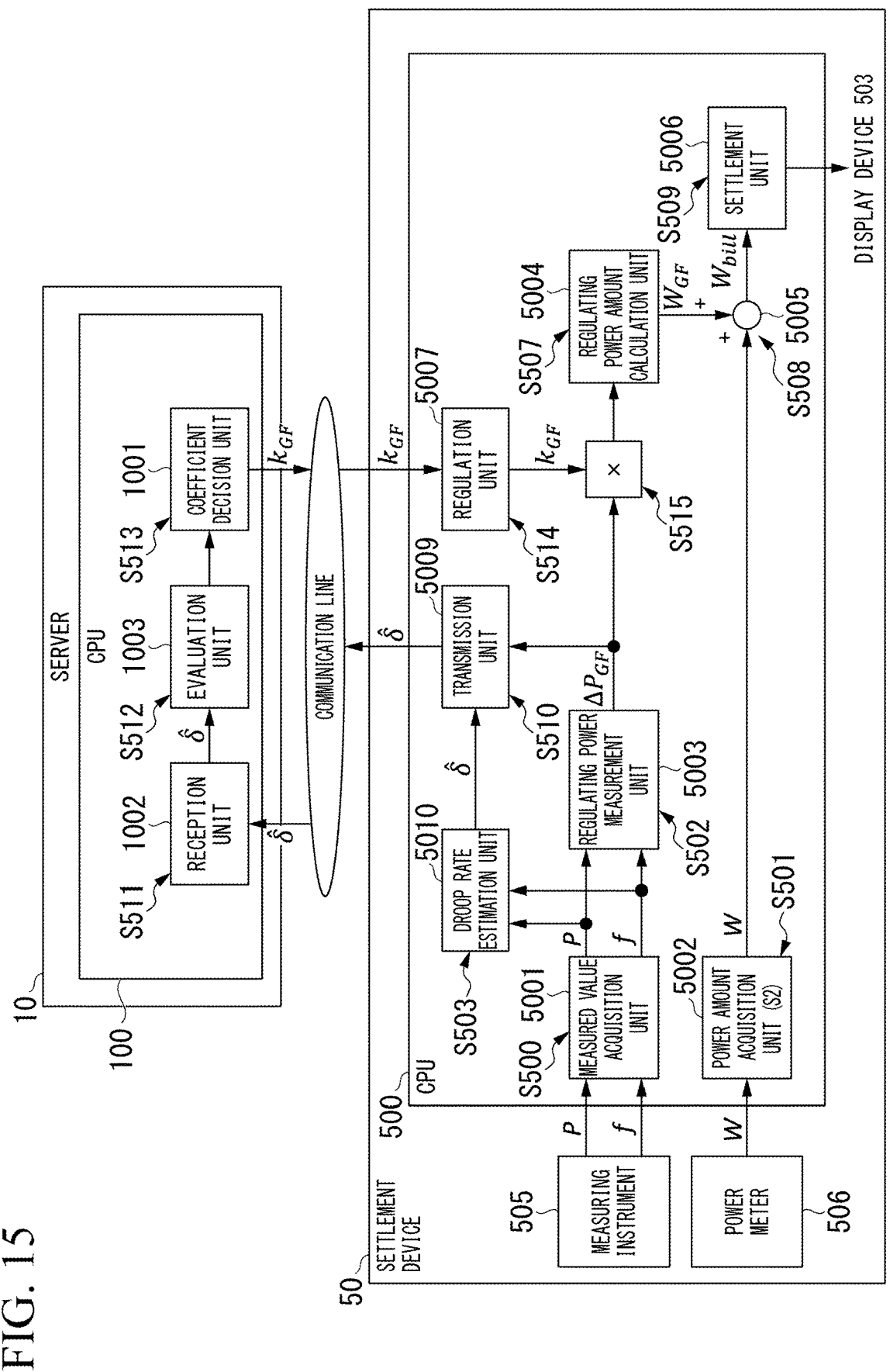
FIG. 15 is a block diagram showing functional configurations of a settlement device and a server according to a modified example of the fifth embodiment of the present disclosure.

FIG. 15 is a block diagram showing functional configurations of a settlement device and a server according to a modified example of the fifth embodiment of the present disclosure.

Although a mode in which the settlement device 50 evaluates the stationarity (having the evaluation unit 5008) has been described in the fifth embodiment, the present disclosure is not limited thereto. As in the present modified example (FIG. 15), the mode may be a mode in which the server 10 of the transmission system operator T evaluates stationarity. Differences from the fifth embodiment will be described below with reference to FIG. 15. Although a case where the server 10 evaluates the stationarity of the power plant a will be described here, it is assumed that the server 10 similarly evaluates the other power plants.

As shown in FIG. 15, the CPU 500 of the settlement device 50 has a transmission unit 5009 instead of the evaluation unit 5008. The transmission unit 5009 transmits the droop rate estimate $\hat{\delta}$ of the power plant a estimated by the droop rate estimation unit 5010 to the server 10 via the communication line (S510).

Also, the CPU 100 of the server 10 further has a reception unit 1002 and an evaluation unit 1003. The reception unit 1002 receives the droop rate estimate $\hat{\delta}$ of the power plant a via the communication line (S511).

Subsequently, like the evaluation unit 5008 (FIG. 14) of the settlement device 50, the evaluation unit 1003 of the server 10 calculates the variance between time-series values of the droop rate estimate $\hat{\delta}$ of the power plant a (S504A).

Also, like the evaluation unit 5008 (FIG. 14) of the settlement device 50, the evaluation unit 1003 of the server 10 performs a scoring process for the stationarity of the regulating power production of the power plant a on the basis of the variance between droop rate estimates $\hat{\delta}$ (S504B).

Subsequently, the coefficient decision unit 1001 of the server 10 decides on a price regulation coefficient $k_{GF}$ of the power plant a on the basis of an evaluation result of the evaluation unit 1003 (S513). This processing step is similar to the processing step of the regulation unit 5007 of the settlement device 50 (S505 in FIG. 13).

The coefficient decision unit 1001 of the server 10 transmits the price regulation coefficient $k_{GF}$ of the power plant a to the settlement device 50 of the power plant a via the communication line. When the price regulation coefficient $k_{GF}$ is received (S514), the settlement device 50 outputs a value obtained by multiplying the regulating power PGF measured by the regulating power measurement unit 5003 by the received price regulation coefficient $k_{GF}$ to the regulating power amount calculation unit 5004 (S515). The subsequent processing steps are similar to those of the fifth embodiment.

Operation and Effects

As described above, the settlement method according to the present embodiment is characterized in that a scoring process is performed for stationarity on the basis of the droop rate estimate $\hat{\delta}$.

Consequently, it is possible to more strictly evaluate the stationarity of each regulating power providing means regardless of the magnitudes of supply and demand fluctuations.

Sixth Embodiment

Next, a settlement system 1 according to a sixth embodiment of the present disclosure will be described with reference to FIG. 16.

The same reference signs are given to components that are the same as those of the first to fifth embodiments and detailed description thereof will be omitted.

Functional Configuration of Settlement Device

Figure 16:
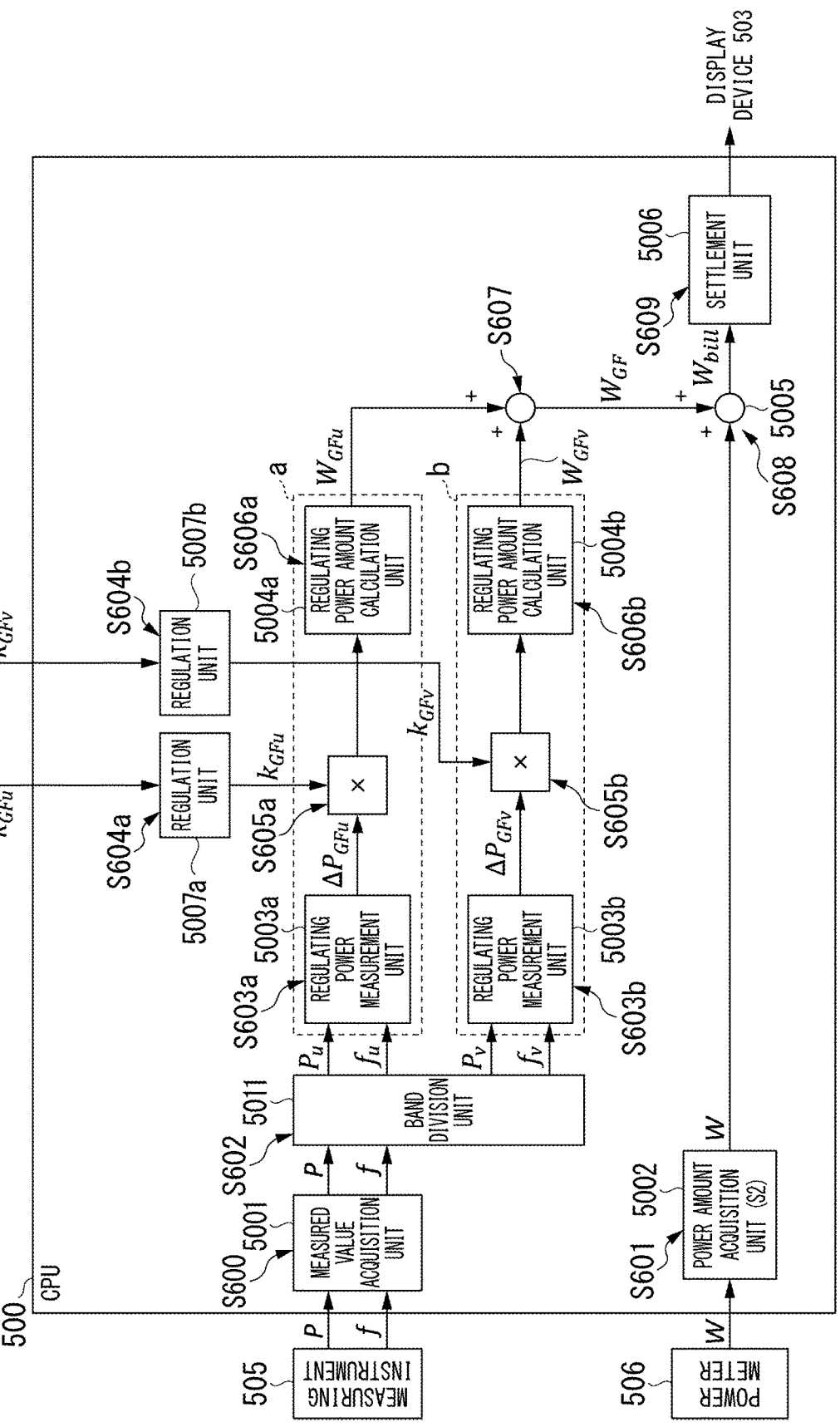
FIG. 16 is a block diagram showing a functional configuration of a settlement device according to a sixth embodiment of the present disclosure.

FIG. 16 is a block diagram showing a functional configuration of a settlement device according to the sixth embodiment of the present disclosure.

In the second embodiment (FIG. 7), a mode in which the settlement device 50 has one regulating power measurement unit 5003 and one regulating power amount calculation unit 5004 has been described. In contrast, as shown in FIG. 16, the settlement device 50 of the present embodiment has a plurality of pairs a, b, and the like each having the regulating power measurement unit 5003 and the regulating power amount calculation unit 5004. Also, the settlement device 50 has a plurality of regulation units 5007a, 5007b, and the like corresponding to the pairs a, b, and the like. Furthermore, the settlement device 50 has a band division unit 5011.

In FIG. 16, an example in which the settlement device 50 has two pairs including a pair a consisting of a regulating power measurement unit 5003a and a regulating power amount calculation unit 5004a and a pair b consisting of a regulating power measurement unit 5003b and a regulating power amount calculation unit 5004b is shown. The present embodiment is characterized in that values of a fast-response component (a first component) and a slow-response component (a second component) included in the regulating power are differentiated. A difference between the values is represented by a price regulation coefficient $k_{GF}$. The settlement device 50 calculates an amount of regulating power $W_{GFu}$ of the fast-response component (the first component) in the pair a and calculates an amount of regulating power $W_{GFv}$ of the slow-response component (the second component) in the pair b. Also, in other embodiments, the band division unit 5011 may be arranged in a distributed way in the regulating power measurement unit. In this case, for example, the regulating power measurement unit 5003a has a band division unit 5011 that extracts a high-band component (a first component) and calculates an amount of regulating power $W_{GFu}$ of the extracted first component. Also, the regulating power measurement unit 5003b has the band division unit 5011 that extracts a low-band component (a second component) and calculates an amount of regulating power $W_{GFv}$ of the extracted second component.

Processing Flow of Settlement Device

The processing flow of the settlement device 50 according to the present embodiment (the settlement method using the settlement device 50) will be described in detail below with reference to FIG. 16.

Also, processing step S600 of the measured value acquisition unit 5001 and processing step S601 of the power amount acquisition unit 5002 are similar to processing steps S200 and S201 (FIG. 7) of the second embodiment.

The band division unit 5011 divides the measured active power value P into a fast component $P_u$ and a slow component $P_v$. Likewise, the band division unit 5011 also divides the measured frequency value f into a fast component $f_u$ and a slow component $f_v$ (step S602). Details of the process of the band division unit 5011 will be described below.

Subsequently, the fast component $P_u$ of the measured active power value and the fast component $f_u$ of the measured frequency value are input to the regulating power measurement unit 5003a of the pair a, and a fast component $\Delta P_{GFu}$ (first regulating power) of the regulating power is calculated (step 603a). Likewise, the slow component $P_v$ of the measured active power value and the slow component $f_v$ of the measured frequency value are input to the regulating power measurement unit 5003b of the pair b and a slow component $\Delta P_{GFv}$ (second regulating power) of the regulating power is calculated (step 603b).

Subsequently, the regulation unit 5007a acquires a price regulation coefficient $k_{GFu}$ (a first price regulation coefficient) indicating a value of the fast component corresponding to the current time from the coefficient storage unit (step S604a). Likewise, the regulation unit 5007b acquires a price regulation coefficient $k_{GFv}$ (a second price regulation coefficient) indicating a value of the slow component corresponding to the current time from the coefficient storage unit (step S604b).

After the regulating power $\Delta P_{GFu}$ corresponding to the fast component is multiplied by the price regulation coefficient $k_{GFu}$ to regulate a difference in value (step S605a), multiplication results are integrated by the regulating power amount calculation unit 5004a to obtain the amount of regulating power $W_{GFu}$ (a first amount of regulating power) corresponding to the fast component (step S606a). Likewise, after the regulating power $\Delta P_{GFv}$ corresponding to the slow component is multiplied by the price regulation coefficient $k_{GFv}$ to regulate a difference in value (step S605b), multiplication results are integrated by the regulating power amount calculation unit 5004b to obtain the amount of power $W_{GFv}$ (a second amount of regulating power) corresponding to the slow component (step S606a).

Also, a sum of the amounts of regulating power $W_{GFu}$ and $W_{GFv}$ calculated for the pairs a and b becomes an amount of regulating power $W_{GF}$ (step S607). The subsequent processing step S608 of the addition unit 5005 and the subsequent processing step S609 of the settlement unit 5006 are similar to processing steps S206 and S207 (FIG. 7) of the second embodiment.

Regarding Process of Band Division Unit

The present embodiment is characterized in that the difference in value between the fast component and the slow component is reflected in the amount of regulating power $W_{GF}$. In the present embodiment, a band division unit 5011 is provided in order to divide the components for calculation. Here, processing step S602 of the band division unit 5011 will be described in detail.

First, the band division of the measured frequency value f will be described. The band division unit 5011 includes, for example, a filter. Also, for example, a filter that extracts a component with a time constant of 10 seconds or less as a fast component may be implemented as a transfer function such as the following Equation (10). In Equation (10), s denotes a Laplacian operator.

[Equation 10]

$$G_u = \frac{10\,s}{10\,s+1} \quad (10)$$

Using this transfer function, the fast component $f_u$ of the measured frequency value is calculated by the following Equation (11).

[Equation 11]

$$f_u = G_u f \quad (11)$$

Also, if, for example, a component with a time constant of 300 seconds or less, is extracted as the slow component, the transfer function $G_v$ of the filter is defined by the following Equation (12).

[Equation 12]

$$G_v = \frac{300\,s}{300\,s+1} \quad (12)$$

The slow component G of the measured frequency value is calculated by the following Equation (13) from this transfer function and "f−$f_u$" obtained by subtracting the slow component $f_u$ from the measured frequency value f.

[Equation 13]

$$f_v = G_v(f - f_u) \quad (13)$$

Although an example in which the band division unit 5011 divides the band into two has been described in the present embodiment, the present disclosure is not limited thereto. In another embodiment, the band division unit 5011 may divide the band into three or more. For example, if a time constant of 2700 seconds or less is taken out as a third division (a third component), a third transfer function $G_w$ is defined as in the following Equation (14).

[Equation 14]

$$G_w = \frac{2700\,s}{2700\,s+1} \quad (14)$$

The band division unit 5011 uses the transfer function $G_w$ shown in Equation (14) to calculate a slower component $f_c$ by Equation (15).

[Equation 15]

$$f_w = G_w(f - f_u - f_v) \quad (15)$$

By iterating this process, it is possible to increase the number of divisions to any number. Also, when the number of band divisions is increased to three, it is only necessary to calculate the amount of regulating power $W_{GF}$ for each component by increasing the number of pairs each having the regulating power measurement unit 5003 and the regulating power amount calculation unit 5004 to three. The same is also true for the case where the band is divided into four or more.

Next, the band division of the measured active power value P performed by the band division unit 5011 will be described. The filter performs a band division process for the measured active power value P using the division that is the same as that of the measured frequency value. Each component of the measured active power value P after the band division is obtained by the following Equations (16).

[Equation 16]

$$P_u = G_u P$$

$$P_v = G_v(P - P_u)$$

$$P_w = G_w(P - P_u - P_v) \quad (16)$$

The regulating power measurement unit 5003a calculates the regulating power $\Delta P_{GFu}$ after the band division from Equation (2), Equation (2B), or Equation (2C). In Equation (2), Equation (2B), or Equation (2C), $P_u$ is substituted for P and $f_u$ is substituted for f for calculation. The same is also true for the regulating power $\Delta P_{GFu}$ and the regulating power $\Delta P_{GFw}$ after the band division.

Although an example in which the configuration including the band division unit 5011, the plurality of regulating power measurement units 5003, the regulating power amount calculation unit 5004, and the regulation unit 5007 is applied to the configuration of the second embodiment (FIG. 7) has been described in the present embodiment, the present disclosure is not limited thereto. In other embodiments, the configuration of the band division unit 5011 or the like described above may be applied to the configuration of the third embodiment (FIG. 9), the configuration of the fourth embodiment (FIGS. 10 and 12), or the configuration of the fifth embodiment (FIGS. 13 and 15).

Operation and Effects

As described above, in the settlement method according to the present embodiment, the measured active power value P and the measured frequency value f are divided into a plurality of components for each band. Also, the amount of regulating power for each component is calculated after regulating a value by multiplying regulating power for each division component by a price regulation coefficient $k_{GF}$ that differs according to each component.

Consequently, it is possible to calculate the regulating power of the regulating power providing means for each component. Thereby, it is possible to pay more appropriate compensation for the regulating power of the regulating power providing means.

While several embodiments of the present invention have been described above, these embodiments have been presented by way of example only, and are not intended to limit the scope of the inventions. These embodiments may be embodied in a variety of other forms. Various omissions, substitutions, and combinations may be made without departing from the spirit of the inventions. The inventions described in the accompanying claims and their equivalents are intended to cover such embodiments or modifications as would fall within the scope and spirit of the inventions.

For example, a mode in which the power sources 21, 22, and the like generate power using the turbine device 211 and the power generator has been described in each of the above embodiments, but the present disclosure is not limited thereto. In another embodiment, a mode in which the power sources 21, 22, and the like perform photovoltaic power generation using a solar cell may be provided.

APPENDIXES

The settlement device, the settlement system, the settlement method, and the program described in the above embodiments are ascertained, for example, as follows.

According to a first aspect of the present disclosure, there is provided a settlement device (50) including: a measured value acquisition unit (5001) configured to acquire a measured value of active power transmitted or received at a connection point of a power transmission and distribution network and a regulating power providing means capable of providing regulating power to the power transmission and distribution network and a measured value of a frequency at the connection point; a regulating power measurement unit (5003) configured to measure regulating power at the connection point on the basis of the acquired measured value of the active power and the acquired measured value of the frequency; a regulating power amount calculation unit (5004) configured to calculate an amount of regulating power of a prescribed period at the connection point by integrating the regulating power over time; a power amount acquisition unit (5002) configured to acquire an amount of power transmitted or received in the prescribed period at the connection point; and a settlement unit (5006) configured to settle compensation for the regulating power provided by the regulating power providing means and the power transmitted or received by the regulating power providing means on the basis of a sum of the amount of regulating power and the amount of power.

Thereby, the settlement device 50 can settle both the compensation corresponding to the amount of power transmitted or received by the regulating power providing means and the compensation corresponding to the regulating power of power supply and demand.

According to a second aspect of the present disclosure, the settlement device (50) according to the first aspect further includes a regulation unit (5007) configured to multiply the measured regulating power by a price regulation coefficient for regulating the compensation for the regulating power, wherein the regulating power amount calculation unit (5004) calculates the amount of regulating power by integrating values obtained by multiplying the regulating power by the price regulation coefficient.

Thereby, it is possible to change the compensation for the amount of regulating power in accordance with the power supply and demand.

According to a third aspect of the present disclosure, the settlement device (50) according to the second aspect further includes a coefficient storage unit (504) configured to store a plurality of price regulation coefficients whose values are preset to differ in accordance with a date and time, wherein the regulation unit (5007) acquires the price regulation coefficient corresponding to the prescribed period from the coefficient storage unit (504).

Thereby, if the power supply and demand fluctuate according to the date and time, the compensation for the amount of regulating power can be changed according to the power supply and demand fluctuations.

According to a fourth aspect of the present disclosure, the settlement device (50) according to the second aspect, the regulation unit (5007) acquires the price regulation coefficient from a server (10) of a transmission system operator who manages the power transmission and distribution network.

Consequently, the transmission system operator T can change the price regulation coefficient in accordance with supply and demand fluctuations and regulate an incentive for regulating power calculation.

According to a fifth aspect of the present disclosure, the settlement device (50) according to the second aspect further includes an evaluation unit (5008) configured to evaluate stationarity of the regulating power of the regulating power providing means, wherein the regulation unit (5007) changes the price regulation coefficient in accordance with an evaluation result of the evaluation unit (5008).

Consequently, it is possible to give a higher incentive to the regulating power providing means with higher stationarity than to the regulating power providing means with lower stationarity. For example, the regulating power providing means that provides regulating power quickly can be given a higher incentive than other regulating power providing means. Thereby, the stability of the frequency in the target power transmission and distribution network N1 can be further improved.

According to a sixth aspect of the present disclosure, in the settlement device (50) according to the fifth aspect, the evaluation unit (5008) evaluates the stationarity on the basis of variance of increment in the regulating power for each step calculated from time-series data of the regulating power.

According to a seventh aspect of the present disclosure, in the settlement device (50) according to the fifth or sixth aspect, the evaluation unit (5008) evaluates the stationarity on the basis of variance of increment in the amount of regulating power for each given period calculated from time-series data of the amount of regulating power.

Consequently, it is possible to give a higher incentive to the regulating power providing means with higher stationarity than to the regulating power providing means with lower stationarity. For example, the regulating power providing means that provides regulating power constantly can be given a higher incentive than other regulating power providing means. Thereby, the stability of the frequency in the target power transmission and distribution network N1 can be further improved.

According to an eighth aspect of the present disclosure, the settlement device (50) according to the fifth aspect further includes a droop rate estimation unit (5010) configured to estimate a droop rate of the regulating power providing means on the basis of the measured value of the active power and the measured value of the frequency, wherein the evaluation unit (5008) evaluates the stationarity on the basis of variance of increment in an estimated value of the droop rate calculated from time-series data of an estimated value of the droop rate.

Consequently, it is possible to more strictly evaluate the stationarity of each regulating power providing means, regardless of magnitudes of supply and demand fluctuations.

According to a ninth aspect of the present disclosure, in the settlement device (50) according to any one of the second to eighth aspects, the regulating power measurement unit (5003) measures first regulating power of a first component and second regulating power of a second component with respect to the first component and the second component obtained by dividing the acquired measured value of the active power and the acquired measured value of the frequency according to band, the regulation unit (5007) multiplies the first regulating power by a first price regulation coefficient corresponding to the first component and multiplies the second regulating power by a second price regulation coefficient corresponding to the second component, and the regulating power amount calculation unit (5004) calculates an amount of first regulating power corresponding to the first component by integrating values obtained by multiplying the first regulating power by the first price regulation coefficient and calculates an amount of second regulating power corresponding to the second component by integrating values obtained by multiplying the second regulating power by the second price regulation coefficient.

Consequently, it is possible to calculate the regulating power of the regulating power providing means for each component. Thereby, it is possible to pay more appropriate compensation for the regulating power of the regulating power providing means.

According to a tenth aspect of the present disclosure, there is provided a settlement system (1) including: a settlement device (50) provided at a connection point of a power transmission and distribution network and a regulating power providing means capable of providing regulating power to the power transmission and distribution network; and a server (10) communicatively connected to the settlement device (50), wherein the settlement device (50) includes a measured value acquisition unit (5001) configured to acquire a measured value of active power transmitted or received at the connection point and a measured value of a frequency at the connection point; a regulating power measurement unit (5003) configured to measure regulating power at the connection point on the basis of the acquired measured value of the active power and the acquired measured value of the frequency; a regulation unit (5007) configured to multiply a price regulation coefficient for regulating compensation for the regulating power by the measured regulating power; a regulating power amount calculation unit (5004) configured to calculate an amount of regulating power of a prescribed period at the connection point by integrating values obtained by multiplying the regulating power by the price regulation coefficient over time; a power amount acquisition unit (5002) configured to acquire an amount of power transmitted or received in the prescribed period at the connection point; and a settlement unit (5006) configured to settle compensation for the regulating power provided by the regulating power providing means and the power transmitted or received by the regulating power providing means on the basis of a sum of the amount of regulating power and the amount of power. The server (10) includes an evaluation unit (1003) configured to evaluate stationarity of the regulating power of the regulating power providing means; and a coefficient decision unit (1001) configured to change the price regulation coefficient in accordance with a result of evaluating the stationarity in the evaluation unit. The regulation unit (5007) of the settlement device (50) acquires the price regulation coefficient changed by the coefficient decision unit (1001) of the server (10).

According to an eleventh aspect of the present disclosure, there is provided a settlement method including steps of: acquiring a measured value of active power transmitted or received at a connection point of a power transmission and distribution network and a regulating power providing means capable of providing regulating power to the power transmission and distribution network and a measured value of a frequency at the connection point; measuring regulating power at the connection point on the basis of the acquired measured value of the active power and the acquired measured value of the frequency; calculating an amount of regulating power of a prescribed period at the connection point on the basis of the regulating power; acquiring an amount of power transmitted or received in the prescribed period at the connection point; and settling compensation for the regulating power provided by the regulating power providing means and the power transmitted or received by the regulating power providing means on the basis of a sum of the amount of regulating power and the amount of power.

According to a twelfth aspect of the present disclosure, there is provided a program for causing a computer (900) of a settlement device (50) to execute steps of: acquiring a measured value of active power transmitted or received at a connection point of a power transmission and distribution network and a regulating power providing means capable of providing regulating power to the power transmission and distribution network and a measured value of a frequency at the connection point; measuring regulating power at the connection point on the basis of the acquired measured value of the active power and the acquired measured value of the frequency; calculating an amount of regulating power of a prescribed period at the connection point on the basis of the regulating power; acquiring an amount of power transmitted or received in the prescribed period at the connection point; and settling compensation for the regulating power provided by the regulating power providing means and the power transmitted or received by the regulating power providing means on the basis of a sum of the amount of regulating power and the amount of power.

INDUSTRIAL APPLICABILITY

According to a settlement device, a settlement system, a settlement method, and a program related to the present disclosure, it is possible to settle both compensation corresponding to an amount of transmitted or received power and compensation corresponding to regulating power of power supply and demand.

REFERENCE SIGNS LIST

1 Settlement system
10 Server
100 CPU
1001 Coefficient decision unit
1002 Reception unit 1003 Evaluation unit
101 Memory
102 Communication interface
103 Storage
21, 22, 23 Power supply
210 Control unit
211 Turbine device
212 Power generator
50 Settlement device
500 CPU
5001 Measured value acquisition unit
5002 Power amount acquisition unit
5003, 5003a, 5003b Regulating power measurement unit
5004, 5004a, 5004b Regulating power amount calculation unit
5005 Addition unit
5006 Settlement unit
5007, 5007a, 5007b Regulation unit
5008 Evaluation unit
5009 Transmission unit
5010 Droop rate estimation unit
5011 Band division unit
501 Memory
502 Communication interface
503 Display device
504 Storage (coefficient storage unit)
505 Measuring instrument
506 Power meter
900 Computer

The invention claimed is:

1. A measurement device comprising:
a measured value acquisition unit configured to acquire a measured value of active power transmitted or received at a connection point of a power transmission and distribution network and a regulating power providing means that provides regulating power to the power transmission and distribution network and a measured value of a frequency at the connection point;
a regulating power measurement unit configured to measure regulating power at the connection point based on the acquired measured value of the active power and the acquired measured value of the frequency, the regulating power being represented in units of electric power;
a regulating power amount calculation unit configured to calculate an amount of regulating power of a prescribed period at the connection point by integrating the regulating power over time;
a power amount acquisition unit configured to acquire an amount of power transmitted or received in the prescribed period at the connection point; and
an addition unit configured to add the amount of regulating power to the amount of power to obtain a settled amount of power as a payment target of compensation for the regulating power provided by the regulating power providing means and the power transmitted or received by the regulating power providing means,
wherein the regulating power measurement unit measures the regulating power so as to be a positive value in case that one of a first difference between the acquired measured value of the active power and a previous measured value of the active power and a second difference between the acquired measured value of the frequency and a previous measured value of the frequency is a positive value and another of the first difference and the second difference is a negative value, and measures the regulating power so as to be a negative value in case that both of the first difference and the second difference are positive values or negative values.

2. The measurement device according to claim 1, further comprising:
a regulation unit configured to multiply the measured regulating power by a price regulation coefficient for regulating the compensation for the regulating power, wherein
the regulating power amount calculation unit calculates the amount of regulating power by integrating values obtained by multiplying the regulating power by the price regulation coefficient.

3. The measurement device according to claim 2, further comprising:
a coefficient storage unit configured to store a plurality of price regulation coefficients whose values are preset to differ in accordance with a date and time, wherein
the regulation unit acquires the price regulation coefficient corresponding to the prescribed period from the coefficient storage unit.

4. The measurement device according to claim 2, wherein the regulation unit acquires the price regulation coefficient from a server of a transmission system operator who manages the power transmission and distribution network.

5. The measurement device according to claim 2, further comprising:
an evaluation unit configured to evaluate stationarity of the regulating power of the regulating power providing means, wherein
the regulation unit changes the price regulation coefficient in accordance with an evaluation result of the evaluation unit.

6. The measurement device according to claim 5, wherein the evaluation unit evaluates the stationarity based on variance of increment in the regulating power for each step calculated from time-series data of the regulating power.

7. The measurement device according to claim 5, wherein the evaluation unit evaluates the stationarity based on variance of increment in the amount of regulating power for each given period calculated from time-series data of the amount of regulating power.

8. The measurement device according to claim 5, further comprising:
a droop rate estimation unit configured to estimate a droop rate of the regulating power providing means based on the measured value of the active power and the measured value of the frequency, wherein
the evaluation unit evaluates the stationarity based on variance of increment in an estimated value of the droop rate calculated from time-series data of an estimated value of the droop rate.

9. The measurement device according to claim 2, wherein
the regulating power measurement unit measures first regulating power of a first component and second regulating power of a second component with respect to the first component and the second component obtained by dividing the acquired measured value of the active power and the acquired measured value of the frequency according to band,
the regulation unit multiplies the first regulating power by a first price regulation coefficient corresponding to the first component and multiplies the second regulating power by a second price regulation coefficient corresponding to the second component, and
the regulating power amount calculation unit calculates an amount of first regulating power corresponding to the first component by integrating values obtained by multiplying the first regulating power by the first price regulation coefficient and calculates an amount of second regulating power corresponding to the second component by integrating values obtained by multiplying the second regulating power by the second price regulation coefficient.

10. The measurement device according to claim 1, wherein
the regulating power measurement unit measures the regulating power using one of following equations:

$$\Delta P_{GF}(t) = -\text{sgn}(f(t) - f(t - \Delta T)) \times (P(t) - P(t - \Delta T))$$

$$\Delta P_{GF}(t) = -\text{sgn}(f(t) - f(t - \Delta T)) \times \left(P(t) - P(t - \Delta T)\frac{f(t)}{f(t - \Delta T)}\right)$$

$$\Delta P_{GF}(t) = \frac{\text{Cov}(P(t) - P(t - \Delta T), f(t) - f(t - \Delta T))}{\text{Var}(f(t) - f(t - \Delta T))} \times E(|f(t) - f(t - \Delta T)|)$$

$$\Delta P_{GF}(t) = \frac{\text{Cov}\left(P(t) - P(t - \Delta T)\frac{f(t)}{f(t - \Delta T)}, f(t) - f(t - \Delta T)\right)}{\text{Var}(f(t) - f(t - \Delta T))} \times E(|f(t) - f(t - \Delta T)|)$$

where
$\Delta PGF(t)$ is the regulating power,
$f(t)$ is the acquired measured value of the frequency,
$f(t-\Delta T)$ is the previous measured value of the frequency,
$P(t)$ is the acquired measured value of the active power, and
$P(t-\Delta T)$ is the previous measured value of the active power.

11. A measurement system comprising:
a measurement device provided at a connection point of a power transmission and distribution network and a regulating power providing means that provides regulating power to the power transmission and distribution network; and
a server communicatively connected to the measurement device, wherein
the measurement device includes:
a measured value acquisition unit configured to acquire a measured value of active power transmitted or received at the connection point and a measured value of a frequency at the connection point;
a regulating power measurement unit configured to measure regulating power at the connection point based on the acquired measured value of the active power and the acquired measured value of the frequency, the regulating power being represented in units of electric power;
a regulation unit configured to multiply a price regulation coefficient for regulating compensation for the regulating power by the measured regulating power;
a regulating power amount calculation unit configured to calculate an amount of regulating power of a prescribed period at the connection point by integrating values obtained by multiplying the regulating power by the price regulation coefficient over time;
a power amount acquisition unit configured to acquire an amount of power transmitted or received in the prescribed period at the connection point; and
an addition unit configured to add the amount of regulating power to the amount of power to obtain a settled amount of power as a payment target of compensation for the regulating power provided by the regulating power providing means and the power transmitted or received by the regulating power providing means the regulating power measurement unit measures the regulating power so as to be a positive value in case that one of a first difference between the acquired measured value of the active power and a previous measured value of the active power and a second difference between the acquired measured value of the frequency and a previous measured value of the frequency is a positive value and another of the first difference and the second difference is a negative value, and measures the regulating power so as to be a negative value in case that both of the first difference and the second difference are positive values or negative values, the server includes:
an evaluation unit configured to evaluate stationarity of the regulating power of the regulating power providing means; and
a coefficient decision unit configured to change the price regulation coefficient in accordance with a result of evaluating the stationarity in the evaluation unit, and
the regulation unit of the measurement device acquires the price regulation coefficient changed by the coefficient decision unit of the server.

12. A measurement method comprising:
acquiring a measured value of active power transmitted or received at a connection point of a power transmission and distribution network and a regulating power providing means that provides regulating power to the power transmission and distribution network and a measured value of a frequency at the connection point;
measuring regulating power at the connection point based on the acquired measured value of the active power and the acquired measured value of the frequency, the regulating power being represented in units of electric power;
calculating an amount of regulating power of a prescribed period at the connection point based on the regulating power;
acquiring an amount of power transmitted or received in the prescribed period at the connection point; and
adding the amount of regulating power to the amount of power to obtain a settled amount of power as a payment target of compensation for the regulating power provided by the regulating power providing means and the power transmitted or received by the regulating power providing means, wherein
the measuring of the regulating power includes:
measuring the regulating power so as to be a positive value in case that one of a first difference between the acquired measured value of the active power and a previous measured value of the active power and a second difference between the acquired measured value of the frequency and a previous measured value of the frequency is a positive value and another of the first difference and the second difference is a negative value; and
measuring the regulating power so as to be a negative value in case that both of the first difference and the second difference are positive values or negative values.

13. A non-transitory computer readable medium that stores a program for causing a computer of a measurement device to execute steps of the method according to claim 12.

\* \* \* \* \*